United States Patent [19]

Ferretti et al.

[11] Patent Number: 4,602,344

[45] Date of Patent: Jul. 22, 1986

[54] METHOD AND SYSTEM FOR MEASUREMENT OF LIQUID LEVEL IN A TANK

[75] Inventors: Michael D. Ferretti, Nazareth; Brian L. Gabel, Northampton; James A. Horton, Bethlehem, all of Pa.

[73] Assignee: Air Products and Chemicals, Inc., Allentown, Pa.

[21] Appl. No.: 664,817

[22] Filed: Oct. 25, 1984

[51] Int. Cl.⁴ ............................ G01F 23/00; F15B 5/00
[52] U.S. Cl. ..................................... 364/509; 73/291; 364/575
[58] Field of Search .................. 73/301, 299, 291; 364/575, 509; 364/581

[56] References Cited

U.S. PATENT DOCUMENTS

| | | | |
|---|---|---|---|
| Re. 29,868 | 12/1978 | Schontzler et al. | 364/510 |
| 3,371,534 | 3/1968 | Akeley | 73/299 |
| 3,640,134 | 2/1972 | Hop | 73/299 |
| 3,720,818 | 3/1973 | Spragg et al. | 364/573 X |
| 3,874,238 | 4/1975 | Compton et al. | 364/509 X |
| 4,020,690 | 5/1977 | Samuels et al. | 73/299 |
| 4,059,016 | 11/1977 | Kitzinger | 73/304 R X |
| 4,201,240 | 5/1980 | Case | 137/392 |
| 4,217,777 | 8/1980 | Newman | 73/291 |
| 4,250,750 | 2/1981 | Martinec et al. | 73/308 |
| 4,252,097 | 2/1981 | Hartford | 123/381 |
| 4,296,472 | 10/1981 | Sarkis | 364/509 |
| 4,313,114 | 1/1982 | Lee et al. | 340/870 |
| 4,317,178 | 2/1982 | Head | 364/581 |
| 4,332,166 | 6/1982 | Lawford | 73/299 |
| 4,353,245 | 10/1982 | Nicolai | 73/49.2 |
| 4,355,363 | 10/1982 | Colby et al. | 364/509 |
| 4,361,037 | 11/1982 | Hauschild et al. | 73/295 |
| 4,386,406 | 5/1983 | Igarashi et al. | 364/573 X |
| 4,387,434 | 6/1983 | Moncrief, Jr. et al. | 364/509 |
| 4,388,691 | 6/1983 | Nuspl | 364/575 |
| 4,400,779 | 8/1983 | Kosuge et al. | 364/442 |
| 4,402,048 | 8/1983 | Tsuchida et al. | 364/442 |
| 4,434,657 | 3/1984 | Matsumura et al. | 73/304 |
| 4,437,157 | 3/1984 | Kato | 364/442 |
| 4,441,157 | 4/1984 | Gerchman et al. | 364/551 |

Primary Examiner—Daniel M. Yasich
Attorney, Agent, or Firm—Richard A. Dannells, Jr.; James C. Simmons; E. Eugene Innis

[57] ABSTRACT

The computer based remote tank telemetry system uses a method for updating a prior collected average level of substance in a tank. It continuously determines values of differential pressure within the tank and in accordance with the values of differential pressure determines the instantaneous level of substance within the tank. A prior collected average level is stored and is compared with each of the instantaneous values of level thus obtained. On the basis of this comparison a relative weighing factor is determined which weighs the relative contribution of the collected and instantaneous values in determining a new collected value. The new collected average is compared against a predetermined setpoint to determine whether the level of substance in the tank is too low. The results of this comparison can be displayed locally, and using a modem, communicated to a remote display. The method for determining the relative weighing factor has three tiers. The selection of the required tier is done in accordance with the levels compared.

14 Claims, 2 Drawing Figures

METHOD AND SYSTEM FOR MEASUREMENT OF LIQUID LEVEL IN A TANK

BACKGROUND OF THE INVENTION

A. Field of the Invention

This invention relates to the replenishing of substance within liquid storage tanks and, in particular, replenishing such tanks when the substance in the tanks produces erratic pressure readings when drawn or replenished.

B. Background Art

Many liquid products are delivered in bulk to a user's site where they are held in a storage tank, from which either intermittent or continuous withdrawal may occur. Examples include liquid fuels such as domestic heating oil, liquid chemicals employed in manufacturing processes, and liquified gases such as oxygen or nitrogen.

For some applications, it is important that the tank never run dry. For example, liquified nitrogen is a source of inert nitrogen gas for submerging various industrial processes and operations. If the supply of nitrogen runs out during a process run, an entire production lot may be destroyed. Nitrogen gas is also used to purge storage tanks from which flammable liquids are being withdrawn to avoid the entrance of air and the subsequent formation of explosive mixtures. Exhaustion of nitrogen during this process can result in an explosion.

Two methods were commonly employed to insure that liquid was available at all times in these storage tanks. The first method was to anticipate from past experience the rate of withdrawal of liquid from the tank, and to extrapolate in order to estimate the time at which replenishment was needed. This approach assumed that usage patterns were similar to prior usage patterns. If depletion were more rapid than anticipated because of increased use or leakage, the tank could empty before the normal replenishment time was reached. Likewise, if usage were unexpectedly curtailed, an unnecessary trip by the supplier's delivery vehicle resulted in the addition of only a small amount to top off the tank.

The second approach was for the user to periodically measure the amount of substance remaining in the tank, and notify the supplier when a delivery was required. This method depended entirely upon the diligence of the user in adhering to a schedule of tank readings and the user's ability to recognize the necessity of a request for a delivery.

Furthermore, it was not possible, in the case of cryogenic liquids, for the user to obtain a direct measurement of the substance level. Typically, the user had available only pressure readings from the tank from which to determine the substance level. These pressure readings included (1) the pressure in the vapor space at the top of the tank and (2) the differential pressure which is the difference between the vapor space pressure and the pressure at the bottom of the tank, called the substance weight pressure.

The relationship between these two variables, the vapor space pressure and the differential pressure, and the actual substance volume is a complex high order polynominal. Solution charts for this polynomial have been prepared. Thus, to get an accurate measurement of substance volume, the user was required to locate the correct chart entry depending on the pressure readings. These charts were different for different substances and for different tanks.

Further complicating these problems was the fact that, when substance was supplied to a cryogenic tank the vapor space pressure readings became erratic. This happens when the the pump forces new substance into the tank which is at a different temperature than that in the tank. The temperature differential results in vaporization of liquid which in turn causes turbulence in the tank and unpredictable fluctuations. Thus, for practical purposes, it is extremely difficult to determine substance level under conditions of replenishing.

For purposes of considering the patentability of the invention disclosed and claimed, a brief patentability search was conducted. The patents identified to be of possible interest in that search were:

| U.S. Pat. No. | Inventor |
| --- | --- |
| Re. 19,868 | Schontzler et al. |
| 4,201,240 | Case |
| 4,250,750 | Martinec et al. |
| 4,252,097 | Hartford et al. |
| 4,296,472 | Sarkis |
| 4,313,114 | Lee et al. |
| 4,353,245 | Nicolai |
| 4,361,037 | Hauschild et al. |
| 4,402,048 | Tsuchida et al. |
| 4,434,657 | Matsumura et al |
| 4,437,162 | Kato |
| 4,441,157 | Gerchman et al. |

It is therefore an object of this invention to provide reliable substance level monitoring in cryogenic tanks during drawing and replenishing of substance.

It is a further object of this invention to provide constant on-line monitoring of substance level based upon pressure and differential pressure.

It is a further object of the present invention to provide remote telemetry monitoring of substance level of cryogenic tanks to allow determination of when a delivery of more substance is required.

SUMMARY

A system for measuring liquid level in a tank updates a prior collected average level of substance in the tank. It continuously determines values of differential pressure within the tank and in accordance with the values of differential pressure, calculates the instantaneous level of substance within the tank. A prior collected average level is stored and is compared with each of the instantaneous values of level thus obtained. On the basis of this comparison a relative weighting factor is determined which weighs the relative contribution of the collected and instantaneous values in determining a new collected value.

DETAILED DESCRIPTION OF THE INVENTION

Figure 1:
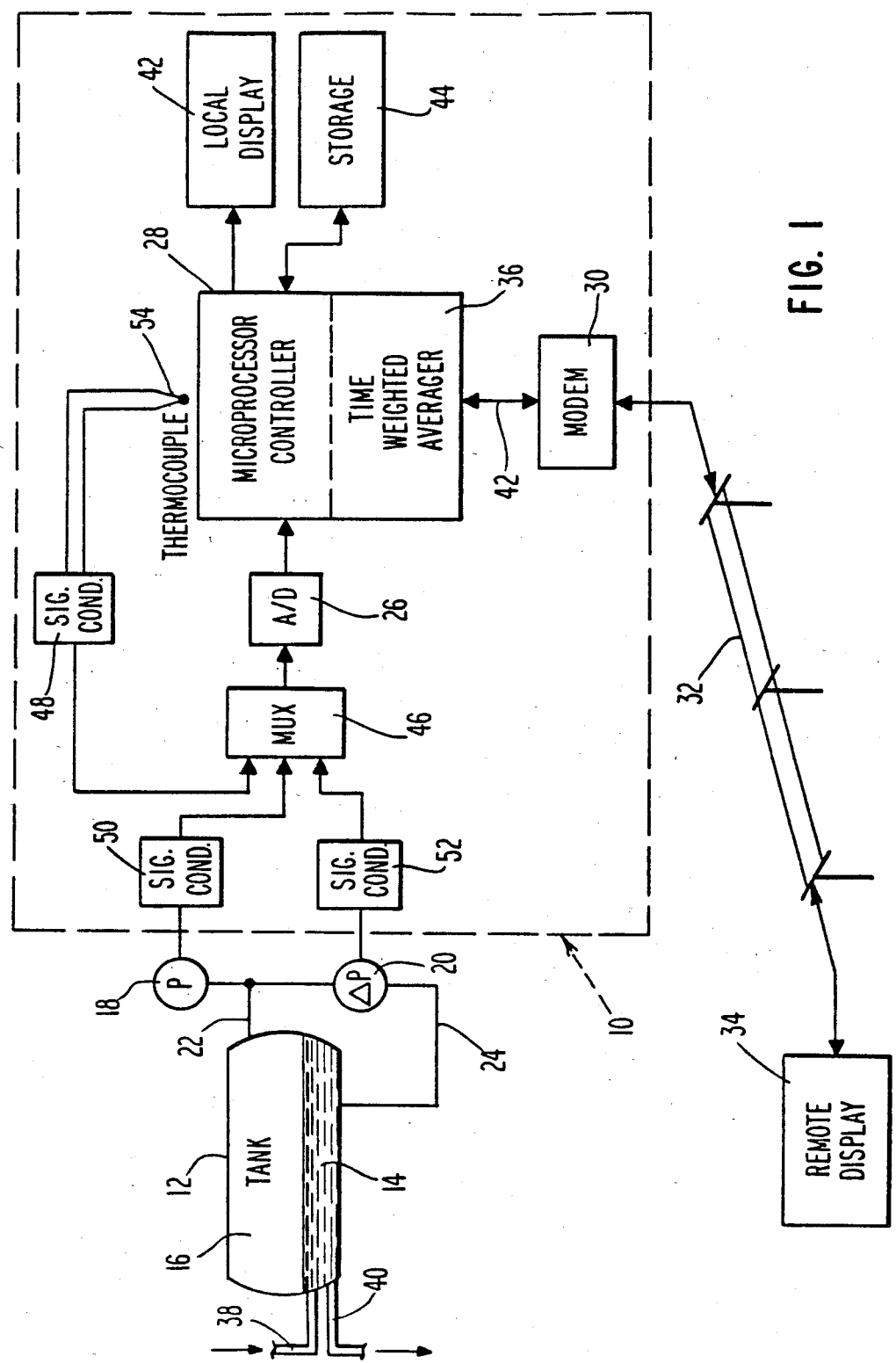
FIG. 1 is a block diagram of system 10 for measuring liquid level in a tank of the present invention.

FIG. 1 shows a block diagram of microprocessor based intelligent remote tank telemetry system 10. Tank telemetry system 10 continuously monitors the substance level of a tank 12 containing a cryogenic liquid, having an inlet 38 and an outlet 40 and containing substance space 14 and vapor space 16. Pressure sense line 22 couples vapor space 16 to pressure transducer 18 and to differential pressure transducer 20. Pressure sense line 24 couples substance space 14 to differential pressure gauge 20. System 10 includes three signal conditioners 48, 50 and 52. The outputs of signal conditioners 48, 50 and 52 are multiplexed by multiplexer 46 and the single output of multiplexer 46 is applied to A/D converter 26. Microprocessor controller 28 has conventional volatile and non-volatile memory and a time-weighted software-based averager 36 which smooths out erratic substance level determinations. Automatic dialing modem 30 is coupled to remote display 34 by telephone lines 32.

Pressure transducer 18 produces an analog signal proportional to the pressure of vapor space 16. Differential pressure transducer 20 produces an analog signal proportional to the difference between the pressure of vapor space 16 and the pressure at the bottom of substance space 14. The analog output signals of transducers 18 and 20 are conditioned by signal conditioners 50 and 52 respectively. The conditioned signals are multiplexed by multiplexer 46 and applied to A/D converter 26.

A/D converter 26 converts the multiplexed analog output signals to digital signals and applies these digital signals to microprocessor controller 28. Based upon the signal generated by differential pressure transducer 20 and received from A/D converter 26, microcontroller 28 periodically determines an instantaneous level of substance in substance space 14. This determination requires only a multiplication of the differential pressure signal by a predetermined constant. A typical value for this constant is 27.67. From these instantaneous values of substance level time-weighted averager 36 determines a collected average level. Controller 28 stores the collected average level and recognizes collected average substance levels below a predetermined threshold set point.

System 10 is applicable to any liquid storage tank 12 but time-weighted average 36 within controller 28 is particularly useful when the substance within tank 12 is a cryogenic substance because of complications inherent in the storage of cryogenic liquids. Thus, time-weighted average 36 is provided within controller 28. When a cryogenic substance is supplied to tank 12 through inlet 38, or drawn from tank 12 through outlet 40, unpredictable erratic fluctuations in the vapor space pressure of vapor space 16 can be produced. This results in fluctuations in the outputs of differential pressure transducer 20. The turbulence which results in differential pressure fluctuation is caused by such factors as the pumps used to move the substance, the temperature differential of the substance being supplied to the tank and that in the tank, and the requirement that a new equilibrium between vapor space 16 and substance space 14 be established.

These problems may occur only periodically during occasional replenishing and drawing of substance in some applications or they may occur on a continuous basis in applications where substance is continuously drawn from tank 12. These erratic fluctuations in differential pressure cause controller 28 to produce erratic instantaneous substance level calculations. The erratic calculated values of substance level could result in false calls by modem 38 to remote display 34 unless the level calculations are smoothed by time-weighted average 36.

Figure 2:
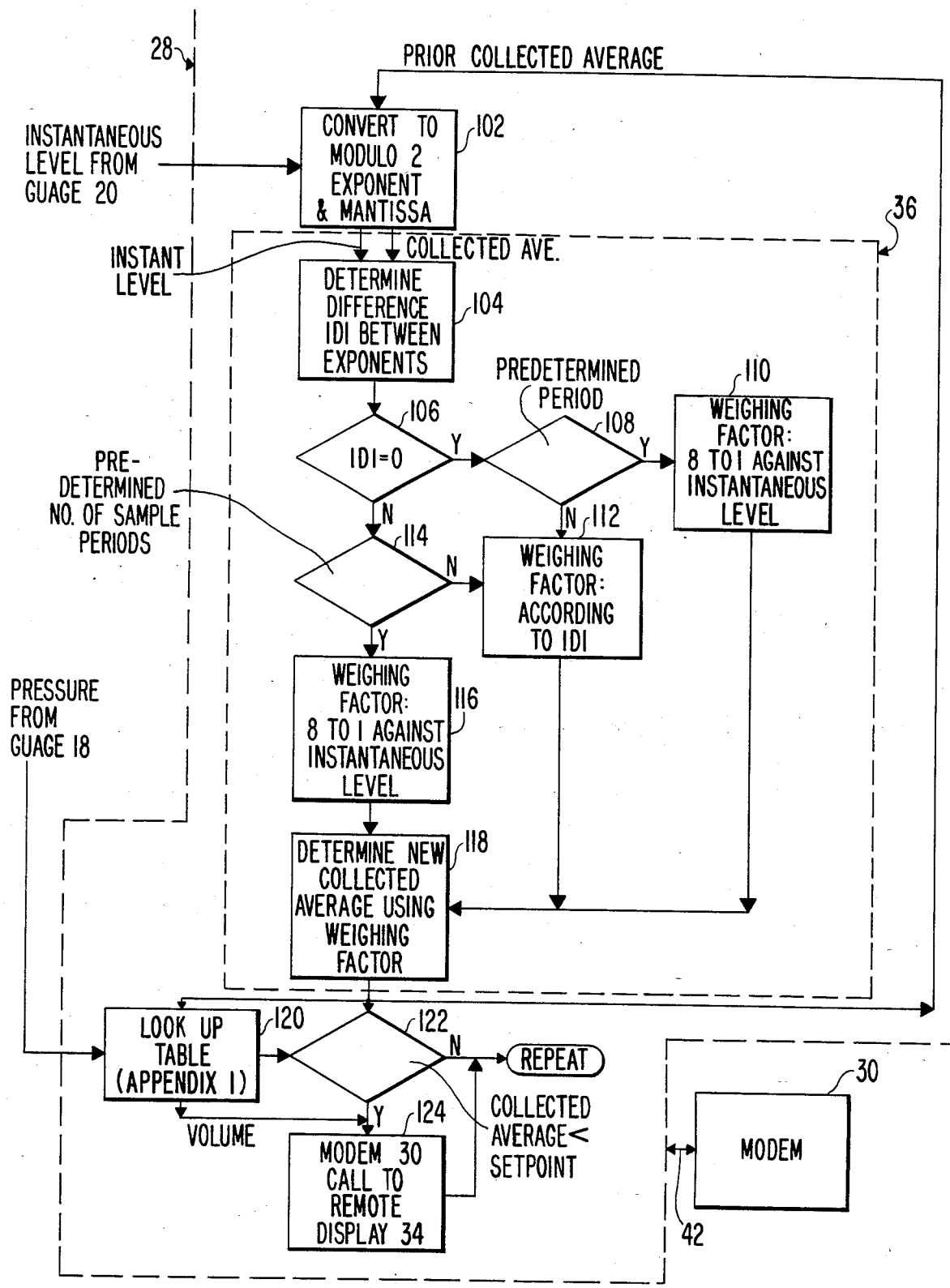
FIG. 2 is a flow diagram of portions of system 10 of FIG. 1.

Referring now to FIG. 2, there is shown a flow diagram of portions of controller 28 and averager 36. Microprocessor controller 28 applies two values to time-weighted averager 36, (1) the instantaneous tank level signal, as determined from the most recent value of differential pressure applied to microcontroller 28, and (2) the prior collected average level stored within the memory of controller 28. The prior collected average is the current level of substance within tank 12 as of the most recent update. The instantaneous tank level is the most recent level calculated and may be based upon quiescent differential pressures or upon sample values of erratically fluctuating differential pressures. The signal conditioning and multiplexing of the signals from transducers 18, 20 have been omitted from FIG. 2 to simplify the drawing.

The instantaneous value of tank level supplied to time-weighted averager 36 is converted into a modulo two mantissa and exponent at block 102 of controller 28 before being supplied to time-weighted averager 36. It is converted into a modulo two mantissa and exponent in the following way. The intantaneous level determined from the vapor space pressure and the differential pressure is repeatedly divided by two until a mantissa between 0 and 0.5 is produced. The number of divisions required to produce such a mantissa is counted and stored in base two form as the exponent. The collected average is processed into a modulo two mantissa and exponent in the same manner before being passed to time-weighted averager 36.

Time-weighted averager 36 then compares the exponent of the new instantaneous level with the exponent of the collected average which it received from controller 28. If a change in the exponent is detected at decision 106, a weighting factor is developed in order to weigh the collected average more heavily than the new instantaneous value. The weighting factor is determined in block 112 by calculating or determining, at block 104, the difference D between the exponent of the collected average value and the exponent of the instantaneous value as determined in block 102 and taking the absolute value of this difference. Each difference of one between the exponents thus results in another factor of two in the relative weighing. Thus, there is an increasing rejection of deviant values because of the base 2 exponential arithmetic in the determination of the weighing factor.

If a difference between the exponent of the collected average and the exponent of the instantaneous level value persists for a predetermined number of sample periods as determined at decision 114 a weighing factor of 8 to 1 against the instantaneous level is determined for one sample period at block 116. A sample period is the time between readings of the signal from transducer 20 and is approximately one minute. One instantaneous value of substance level and one value of collected average level are determined for each such sample period.

The predetermined number of sample periods during which the difference between the instantaneous exponent and the collected exponent must persist before time-weighted averager 36 switches to the 8 to 1 weighing factor for one period varies depending on the size and shape of tank 12 and this number of sample periods is represented as N in decision 114. It is normally two or three periods. Following this one period with an 8 to 1 weighting factor, time-weighted averager 36 returns to using a weighting factor which is the absolute value of the difference between the exponents as described previously for block 112. If a difference between the instantaneous exponent and the collected average exponent again persists for N sample periods, the 8 to 1 weighing factor of block 116 is again determined.

If the exponent of the collected averages and the exponent of the instantaneous values remain equal for a predetermined period of time as determined at decision 108 (usually 2 to 3 sample periods depending on tank 12), the average is weighted 8 to 1 against the instantaneous value at block 110. Thus time-weighted averager 36 is a three tiered time-weighted averager.

There is a first weighting tier which is used when the exponent of the new instantaneous value remains the same as the exponent of the collected average for a predetermined period of time (block 110), a second weighting tier which is used when there is a variation between the collected average exponent and the instantaneous value exponent (block 112), and a third weighting tier which is used when the variation between the collected value exponent and the instantaneous value exponent persists longer than a predetermined period of time (block 116). Regardless of which of the possible instantaneous values are averaged with appropriate weighting factor, the resulting averaged value becomes the new collected average at block 118. The next time that time weighted averager 36 performs its calculations, this new collected average will be used as the prior collected average in block 102.

Controller 28 is coupled to modem 30 by bi-directional line 42. Controller 28 compares the collected average against a predetermined set point value stored in its memory at decision 122. When controller 28 determines that the collected average of the level of substance in tank 12 has fallen below the predetermined low level set point, controller 28 causes automatic dialing modem 40 to dial the remote display 34 over telephone lines 32 as described in block 124, thereby giving notice that a delivery of substance is required. This could result in false calls to remote display 34 because of the erratic fluctuations which occur during drawing and replenishing of tank 12 if not for time-weighted averager 36. Additionally, controller 28 may be programmed to determine the rate at which tank 12 is being depleted based upon determination of values of level over a period of time.

Controller 28 as an alternate embodiment may be programmed to periodically dial remote display 34 and transmit information regarding the current level of substance in tank 12 regardless of what the level may be and to re-dial remote display 34 if a call is not answered. Operators at remote display 34 may also use telephone lines 32 and modem 30 to interrogate controller 28 to determine the level of substance in tank 12 at any time.

The values transmitted to remote display 34 by controller 28 may include the substance level, time, an I.D. code identifying the controller, pressure, and, if a set point alarm has been given, the time of the alarm.

Pressure transducers 18 and 20 are piezoelectric devices which have an analog output range of 2 to 12.5 volts direct current (DC). The analog outputs of transducers 18 and 20 are conditioned by signal conditioners 50 and 52. Signal conditioners 50 and 52 convert the 2.5 to 12 volt output ranges of pressure transducers 18 and 20 to 0 to 5 volt ranges for multiplexer 46 and provides fuses for transducers 18 and 20 at approximately 20 ma. From multiplexer 46 the signals are converted to digital signals by A/D converter 26 and applied to controller 28.

Additionally, there may be a temperature transducer such as thermocouple 54 to monitor the temperature of tank telemetry system 10 itself. However the temperature value is not necessary for determining the level of substance in tank 12. The signal from thermocouple 54 is conditioned by signal conditioner 48 which includes amplification and ice junction compensation for providing a reference temperature for thermocouple 54. The signal from signal conditioner 48 is applied to multiplexer 46 and multiplexed with the signals from signal conditioners 50 and 52. A/D converter 26 applies all multiplexed signals to controller 28.

Controller 28 is programmed to determine the volume of substance within tank 12. To make this determination two parameters are required. The first parameter is the collected average level determined by time-weighted averager 36 and stored in the memory of controller 28. The other parameter required is the pressure within vapor space 16 of tank 12. The pressure within vapor space 16 is coupled by sense line 22 to pressure transducer 18. Pressure transducer 18 produces an analog signal proportional to the pressure within vapor space 16. The analog output of transducer 18 is conditioned by signal conditioner 50, multiplexed by multiplexer 46, and applied to A/D converter 26. Thus, the signal from pressure transducer 18 is applied to microprocessor controller 28 by A/D converter 26, thereby providing controller 28 with the other parameter required to determine the volume of substance space 14.

The relationship between these two parameters, the collected average level, the pressure, and the volume of substance space 14 is a complex high order polynomial. As an alternate embodiment microprocessor 28 may be programmed to solve this polynomial. Alternately a table look up may be performed as shown at block 120. An example of a cryogenic liquid contents chart which may be used for such a table look up appears at the end of the specification as Appendix 1. The table of Appendix 1 contains the solution value of this polynomial for a plurality of pressure and substance level readings and avoids the time delay required to solve the polynomial in real time while system 10 is in operation.

In this look up table, collected average level appears on the vertical axis and pressure appears on the horizontal axis. By choosing a row depending on the average level and a column depending on the pressure a table entry may be selected. This table entry is the volume of substance space 14. Furthermore, controller 28 may be programmed to compare this value of volume against a predetermined volume setpoint and initiate a call to remote display 34 in response thereto as described for the level setpoint comparison, thereby requesting a refill of tank 12.

Additionally, a local display 42 and local nonvolatile storage 44 may be provided. Display 42 and storage 44 allow system 10 to display and/or store all values transmitted by controller 28 to remote display 34, such as pressure, differential pressure, temperature (if a thermocouple is provided), and collected average substance level. Non-volatile storage 44 may be tape or floppy disks, but preferably is low power, semiconductor memory with a back-up power source. The assembly language listing for the program of controller 28 appears at the end of the specification as Appendix 2.

In system 10 the following components have been used for the operation and function as described and shown.

| Reference Numeral | Type |
| --- | --- |
| 18 | Sensym LX 1830 |
| 20 | Sensym LX 1801 |
| 26 | Intersil 7109 |
| 28 | Intel MCS51 Family |
| 46 | AD 7507 |
| 48 | AD 594 |
| 50, 52 | LM 324 |
| 54 | Type J |
| 30 | Micro-Baud Systems Inc. 001-00-80515 |

Although the invention has been particularly shown and described with reference to a preferred embodiment thereof, it will be understood by those skilled in the art that various changes may be made therein without departing from the spirit or scope of the invention.

IGD CRYOGENIC LIQUID CUSTOMER STATION CONTENTS CHART
CLC-110 SERIES    11,000 GAL. TANK    NITROGEN SERVICE
GAUGE CALIBRATED IN INCHES OF WATER

| GAUGE INCHES | STANDARD CUBIC FEET LIQUID AND VAPOR AT TANK PRESSURE OF | | | | | |
| --- | --- | --- | --- | --- | --- | --- |
| | 0. PSIG | 50. PSIG | 100. PSIG | 150. PSIG | 200. PSIG | 250. PSIG |
| 1.00 | --- | --- | --- | --- | --- | --- |
| 2.00 | 6138. | --- | --- | --- | --- | --- |
| 3.00 | 6485. | --- | --- | --- | --- | --- |
| 4.00 | 7152. | --- | --- | --- | --- | --- |
| 5.00 | 8122. | --- | --- | --- | --- | --- |
| 6.00 | 9374. | 24442. | --- | --- | --- | --- |
| 7.00 | 10890. | 24733. | --- | --- | --- | --- |
| 8.00 | 12649. | 25388. | --- | --- | --- | --- |
| 9.00 | 14632. | 26382. | --- | --- | --- | --- |
| 10.00 | 16821. | 27691. | --- | --- | --- | --- |
| 11.00 | 19195. | 29291. | 43011. | --- | --- | --- |
| 12.00 | 21735. | 31156. | 43614. | --- | --- | --- |
| 13.00 | 24422. | 33263. | 44590. | --- | --- | --- |
| 14.00 | 27236. | 35586. | 45908. | --- | --- | --- |
| 15.00 | 30158. | 38101. | 47541. | 62212. | --- | --- |
| 16.00 | 33169. | 40783. | .49458. | 62608. | --- | --- |
| 17.00 | 36249. | 43608. | 51631. | 63423. | --- | --- |
| 18.00 | 39378. | 46551. | 54030. | 64622. | --- | --- |
| 19.00 | 42538. | 49588. | 56627. | 66171. | --- | --- |
| 20.00 | 45710. | 52694. | 59392. | 68036. | 83263. | --- |
| 21.00 | 48881. | 55844. | 62296. | 70183. | 83620. | --- |
| 22.00 | 52053. | 59013. | 65310. | 72577. | 84434. | --- |
| 23.00 | 55225. | 62185. | 68405. | 75185. | 85665. | --- |
| 24.00 | 58396. | 65357. | 71552. | 77972. | 87272. | --- |
| 25.00 | 61568. | 68528. | 74721. | 80904. | 89215. | --- |
| 26.00 | 64740. | 71700. | 77893. | 83946. | 91454. | 106771. |
| 27.00 | 67912. | 74872. | 81064. | 87065. | 93947. | 107186. |
| 28.00 | 71083. | 78043. | 84236. | 90226. | 96654. | 108094. |
| 29.00 | 74255. | 81215. | 87408. | 93397. | 99534. | 109440. |
| 30.00 | 77427. | 84387. | 90580. | 96569. | 102548. | 111194. |
| 31.00 | 80599. | 87559. | 93751. | 99741. | 105654. | 113289. |
| 32.00 | 83770. | 90730. | 96923. | 102913. | 108812. | 115683. |
| 33.00 | 86942. | 93902. | 100095. | 106084. | 111983. | 118327. |
| 34.00 | 90114. | 97074. | 103267. | 109256. | 115155. | 121173. |
| 35.00 | 93286. | 100246. | 106438. | 112428. | 118327. | 124171. |
| 36.00 | 96457. | 103417. | 109610. | 115600. | 121499. | 127274. |
| 37.00 | 99629. | 106589. | 112782. | 118771. | 124670. | 130434. |
| 38.00 | 102801. | 109761. | 115954. | 121943. | 127842. | 133605. |
| 39.00 | 105973. | 112933. | 119125. | 125115. | 131014. | 136777. |
| 40.00 | 109144. | 116104. | 122297. | 128287. | 134186. | 139949. |

| GAUGE INCHES | STANDARD CUBIC FEET LIQUID AND VAPOR AT TANK PRESSURE OF | | | | | |
|---|---|---|---|---|---|---|
| | 0. PSIG | 50. PSIG | 100. PSIG | 150. PSIG | 200. PSIG | 250. PSIG |
| 41.00 | 112316. | 119276. | 125469. | 131458. | 137357. | 143121. |
| 42.00 | 115488. | 122448. | 128641. | 134630. | 140529. | 146292. |
| 43.00 | 118659. | 125619. | 131812. | 137802. | 143701. | 149464. |
| 44.00 | 121831. | 128791. | 134984. | 140973. | 146873. | 152636. |
| 45.00 | 125003. | 131963. | 138156. | 144145. | 150044. | 155807. |
| 46.00 | 128175. | 135135. | 141327. | 147317. | 153216. | 158979. |
| 47.00 | 131346. | 138306. | 144499. | 150489. | 156388. | 162151. |
| 48.00 | 134518. | 141478. | 147671. | 153660. | 159559. | 165323. |
| 49.00 | 137690. | 144650. | 150843. | 156832. | 162731. | 168494. |
| 50.00 | 140862. | 147822. | 154014. | 160004. | 165903. | 171666. |
| 51.00 | 144033. | 150993. | 157186. | 163176. | 169075. | 174838. |
| 52.00 | 147205. | 154165. | 160358. | 166347. | 172247. | 178010. |
| 53.00 | 150377. | 157337. | 163530. | 169519. | 175418. | 181181. |
| 54.00 | 153549. | 160509. | 166701. | 172691. | 178590. | 184353. |
| 55.00 | 156720. | 163680. | 169873. | 175863. | 181762. | 187525. |
| 56.00 | 159892. | 166852. | 173045. | 179034. | 184933. | 190697. |
| 57.00 | 163064. | 170024. | 176217. | 182206. | 188105. | 193868. |
| 58.00 | 166236. | 173196. | 179388. | 185378. | 191277. | 197040. |
| 59.00 | 169407. | 176367. | 182560. | 188550. | 194449. | 200212. |
| 60.00 | 172579. | 179539. | 185732. | 191721. | 197620. | 203384. |
| 61.00 | 175751. | 182711. | 188904. | 194893. | 200792. | 206555. |
| 62.00 | 178923. | 185883. | 192075. | 198065. | 203964. | 209727. |
| 63.00 | 182094. | 189054. | 195247. | 201237. | 207136. | 212899. |
| 64.00 | 185266. | 192226. | 198419. | 204408. | 210307. | 216071. |
| 65.00 | 188438. | 195398. | 201590. | 207580. | 213479. | 219242. |
| 66.00 | 191609. | 198570. | 204762. | 210752. | 216651. | 222414. |
| 67.00 | 194781. | 201741. | 207934. | 213923. | 219823. | 225586. |
| 68.00 | 197953. | 204913. | 211106. | 217095. | 222994. | 228757. |
| 69.00 | 201125. | 208085. | 214277. | 220267. | 226166. | 231929. |
| 70.00 | 204296. | 211256. | 217449. | 223439. | 229338. | 235101. |
| 71.00 | 207468. | 214428. | 220621. | 226610. | 232510. | 238273. |
| 72.00 | 210640. | 217600. | 223793. | 229782. | 235681. | 241444. |
| 73.00 | 213812. | 220772. | 226964. | 232954. | 238853. | 244616. |
| 74.00 | 216983. | 223943. | 230136. | 236126. | 242025. | 247788. |
| 75.00 | 220155. | 227115. | 233308. | 239297. | 245197. | 250960. |
| 76.00 | 223327. | 230287. | 236480. | 242469. | 248368. | 254131. |
| 77.00 | 226499. | 233459. | 239651. | 245641. | 251540. | 257303. |
| 78.00 | 229670. | 236630. | 242823. | 248813. | 254712. | 260475. |
| 79.00 | 232842. | 239802. | 245995. | 251984. | 257883. | 263647. |
| 80.00 | 236014. | 242974. | 249167. | 255156. | 261055. | 266818. |
| 81.00 | 239186. | 246146. | 252338. | 258328. | 264227. | 269990. |
| 82.00 | 242357. | 249317. | 255510. | 261500. | 267399. | 273162. |
| 83.00 | 245529. | 252489. | 258682. | 264671. | 270570. | 276334. |
| 84.00 | 248701. | 255661. | 261854. | 267843. | 273742. | 279505. |
| 85.00 | 251873. | 258833. | 265025. | 271015. | 276914. | 282677. |
| 86.00 | 255044. | 262004. | 268197. | 274186. | 280086. | 285849. |
| 87.00 | 258216. | 265176. | 271369. | 277358. | 283257. | 289021. |
| 88.00 | 261388. | 268348. | 274541. | 280530. | 286429. | 292192. |
| 89.00 | 264560. | 271520. | 277712. | 283702. | 289601. | 295364. |
| 90.00 | 267731. | 274691. | 280884. | 286873. | 292773. | 298536. |

| GAUGE INCHES | STANDARD CUBIC FEET LIQUID AND VAPOR AT TANK PRESSURE OF ||||||
|---|---|---|---|---|---|---|
| | 0. PSIG | 50. PSIG | 100. PSIG | 150. PSIG | 200. PSIG | 250. PSIG |
| 91.00 | 270903. | 277863. | 284056. | 290045. | 295944. | 301707. |
| 92.00 | 274075. | 281035. | 287228. | 293217. | 299116. | 304879. |
| 93.00 | 277247. | 284207. | 290399. | 296389. | 302288. | 308051. |
| 94.00 | 280418. | 287378. | 293571. | 299560. | 305460. | 311223. |
| 95.00 | 283590. | 290550. | 296743. | 302732. | 308631. | 314394. |
| 96.00 | 286762. | 293722. | 299914. | 305904. | 311803. | 317566. |
| 97.00 | 289934. | 296894. | 303086. | 309076. | 314975. | 320738. |
| 98.00 | 293105. | 300065. | 306258. | 312247. | 318147. | 323910. |
| 99.00 | 296277. | 303237. | 309430. | 315419. | 321318. | 327081. |
| 100.00 | 299449. | 306409. | 312601. | 318591. | 324490. | 330253. |
| 101.00 | 302621. | 309581. | 315773. | 321763. | 327662. | 333425. |
| 102.00 | 305792. | 312752. | 318945. | 324934. | 330834. | 336597. |
| 103.00 | 308964. | 315924. | 322117. | 328106. | 334005. | 339768. |
| 104.00 | 312136. | 319096. | 325286. | 331278. | 337177. | 342940. |
| 105.00 | 315307. | 322267. | 328460. | 334450. | 340349. | 346112. |
| 106.00 | 318479. | 325439. | 331632. | 337621. | 343521. | 349284. |
| 107.00 | 321651. | 328611. | 334804. | 340793. | 346692. | 352455. |
| 108.00 | 324823. | 331783. | 337975. | 343965. | 349864. | 355627. |
| 109.00 | 327994. | 334954. | 341147. | 347137. | 353036. | 358799. |
| 110.00 | 331166. | 338126. | 344319. | 350308. | 356207. | 361971. |
| 111.00 | 334338. | 341298. | 347491. | 353480. | 359379. | 365142. |
| 112.00 | 337510. | 344470. | 350662. | 356652. | 362551. | 368314. |
| 113.00 | 340681. | 347641. | 353834. | 359823. | 365723. | 371486. |
| 114.00 | 343853. | 350813. | 357006. | 362995. | 368894. | 374658. |
| 115.00 | 347025. | 353985. | 360178. | 366167. | 372066. | 377829. |
| 116.00 | 350197. | 357157. | 363349. | 369339. | 375238. | 381001. |
| 117.00 | 353368. | 360328. | 366521. | 372510. | 378409. | 384173. |
| 118.00 | 356540. | 363500. | 369693. | 375682. | 381581. | 387344. |
| 119.00 | 359712. | 366672. | 372865. | 378854. | 384753. | 390516. |
| 120.00 | 362884. | 369844. | 376036. | 382026. | 387925. | 393688. |
| 121.00 | 366055. | 373015. | 379208. | 385197. | 391097. | 396859. |
| 122.00 | 369227. | 376187. | 382380. | 388369. | 394268. | 400031. |
| 123.00 | 372399. | 379359. | 385552. | 391541. | 397440. | 403203. |
| 124.00 | 375571. | 382531. | 388723. | 394713. | 400612. | 406375. |
| 125.00 | 378742. | 385702. | 391895. | 397884. | 403783. | 409546. |
| 126.00 | 381914. | 388874. | 395067. | 401056. | 406955. | 412718. |
| 127.00 | 385086. | 392046. | 398238. | 404228. | 410127. | 415890. |
| 128.00 | 388258. | 395218. | 401410. | 407399. | 413299. | 419062. |
| 129.00 | 391429. | 398389. | 404582. | 410571. | 416470. | 422233. |
| 130.00 | 394601. | 401561. | 407754. | 413743. | 419642. | 425405. |
| 131.00 | 397773. | 404733. | 410925. | 416915. | 422814. | 428577. |
| 132.00 | 400944. | 407904. | 414097. | 420086. | 425985. | 431749. |
| 133.00 | 404116. | 411076. | 417268. | 423258. | 429157. | 434920. |
| 134.00 | 407288. | 414248. | 420440. | 426430. | 432329. | 438092. |
| 135.00 | 410460. | 417420. | 423612. | 429601. | 435501. | 441264. |
| 136.00 | 413631. | 420591. | 426784. | 432773. | 438672. | 444435. |
| 137.00 | 416803. | 423763. | 429955. | 435945. | 441844. | 447607. |
| 138.00 | 419975. | 426935. | 433127. | 439117. | 445016. | 450779. |
| 139.00 | 423147. | 430107. | 436299. | 442288. | 448188. | 453951. |
| 140.00 | 426318. | 433278. | 439471. | 445460. | 451359. | 457122. |

| GAUGE INCHES | STANDARD CUBIC FEET LIQUID AND VAPOR AT TANK PRESSURE OF | | | | | |
|---|---|---|---|---|---|---|
| | 0. PSIG | 50. PSIG | 100. PSIG | 150. PSIG | 200. PSIG | 250. PSIG |
| 141.00 | 429450. | 436450. | 442642. | 448632. | 454531. | 460294. |
| 142.00 | 432662. | 439621. | 445814. | 451804. | 457703. | 463466. |
| 143.00 | 435834. | 442793. | 448986. | 454975. | 460874. | 466638. |
| 144.00 | 439005. | 445965. | 452158. | 458147. | 464046. | 469809. |
| 145.00 | 442177. | 449137. | 455329. | 461319. | 467218. | 472981. |
| 146.00 | 445349. | 452308. | 458501. | 464491. | 470390. | 476153. |
| 147.00 | 448520. | 455480. | 461673. | 467662. | 473562. | 479325. |
| 148.00 | 451692. | 458652. | 464845. | 470834. | 476733. | 482496. |
| 149.00 | 454864. | 461824. | 468016. | 474006. | 479905. | 485668. |
| 150.00 | 458036. | 464995. | 471188. | 477178. | 483077. | 488840. |
| 151.00 | 461207. | 468167. | 474360. | 480349. | 486248. | 492012. |
| 152.00 | 464379. | 471339. | 477532. | 483521. | 489420. | 495183. |
| 153.00 | 467551. | 474510. | 480703. | 486693. | 492592. | 498355. |
| 154.00 | 470722. | 477682. | 483875. | 489865. | 495764. | 501527. |
| 155.00 | 473894. | 480854. | 487047. | 493036. | 498935. | 504699. |
| 156.00 | 477066. | 484026. | 490219. | 496208. | 502107. | 507870. |
| 157.00 | 480237. | 487197. | 493390. | 499380. | 505279. | 511042. |
| 158.00 | 483409. | 490369. | 496562. | 502551. | 508451. | 514214. |
| 159.00 | 486581. | 493541. | 499734. | 505723. | 511622. | 517385. |
| 160.00 | 489753. | 496713. | 502906. | 508895. | 514794. | 520557. |
| 161.00 | 492924. | 499884. | 506077. | 512067. | 517966. | 523729. |
| 162.00 | 496096. | 503056. | 509249. | 515238. | 521138. | 526901. |
| 163.00 | 499268. | 506228. | 512421. | 518410. | 524309. | 530072. |
| 164.00 | 502439. | 509400. | 515592. | 521582. | 527481. | 533244. |
| 165.00 | 505611. | 512571. | 518764. | 524754. | 530653. | 536416. |
| 166.00 | 508783. | 515743. | 521936. | 527925. | 533824. | 539587. |
| 167.00 | 511955. | 518915. | 525108. | 531097. | 536996. | 542759. |
| 168.00 | 515127. | 522087. | 528279. | 534269. | 540168. | 545931. |
| 169.00 | 518298. | 525258. | 531451. | 537441. | 543340. | 549103. |
| 170.00 | 521470. | 528430. | 534623. | 540612. | 546512. | 552275. |
| 171.00 | 524642. | 531602. | 537795. | 543784. | 549683. | 555446. |
| 172.00 | 527814. | 534774. | 540966. | 546956. | 552855. | 558618. |
| 173.00 | 530985. | 537945. | 544138. | 550127. | 556027. | 561790. |
| 174.00 | 534157. | 541117. | 547310. | 553299. | 559199. | 564962. |
| 175.00 | 537329. | 544289. | 550482. | 556471. | 562370. | 568133. |
| 176.00 | 540500. | 547460. | 553653. | 559643. | 565542. | 571305. |
| 177.00 | 543672. | 550632. | 556825. | 562814. | 568714. | 574477. |
| 178.00 | 546844. | 553804. | 559996. | 565986. | 571885. | 577649. |
| 179.00 | 550016. | 556976. | 563169. | 569158. | 575057. | 580820. |
| 180.00 | 553187. | 560147. | 566340. | 572330. | 578229. | 583992. |
| 181.00 | 556359. | 563319. | 569512. | 575501. | 581401. | 587164. |
| 182.00 | 559531. | 566491. | 572683. | 578673. | 584572. | 590335. |
| 183.00 | 562703. | 569663. | 575855. | 581845. | 587744. | 593507. |
| 184.00 | 565875. | 572834. | 579027. | 585016. | 590916. | 596679. |
| 185.00 | 569046. | 576006. | 582199. | 588188. | 594087. | 599851. |
| 186.00 | 572218. | 579178. | 585370. | 591360. | 597259. | 603022. |
| 187.00 | 575390. | 582350. | 588542. | 594532. | 600431. | 606194. |
| 188.00 | 578561. | 585521. | 591714. | 597704. | 603603. | 609366. |
| 189.00 | 581733. | 588693. | 594886. | 600875. | 606774. | 612538. |
| 190.00 | 584905. | 591865. | 598058. | 604047. | 609946. | 615709. |

| GAUGE INCHES | STANDARD CUBIC FEET LIQUID AND VAPOR AT TANK PRESSURE OF | | | | | |
|---|---|---|---|---|---|---|
| | 0. PSIG | 50. PSIG | 100. PSIG | 150. PSIG | 200. PSIG | 250. PSIG |
| 191.00 | 588077. | 595036. | 601229. | 607219. | 613118. | 618881 |
| 192.00 | 591248. | 598208. | 604401. | 610391. | 616289. | 622053 |
| 193.00 | 594420. | 601380. | 607573. | 613562. | 619462. | 625224 |
| 194.00 | 597592. | 604552. | 610745. | 616734. | 622633. | 628396 |
| 195.00 | 600764. | 607723. | 613916. | 619906. | 625805. | 631568 |
| 196.00 | 603935. | 610895. | 617088. | 623077. | 628977. | 634740 |
| 197.00 | 607107. | 614067. | 620260. | 626249. | 632148. | 637911 |
| 198.00 | 610279. | 617239. | 623431. | 629421. | 635320. | 641083 |
| 199.00 | 613450. | 620410. | 626603. | 632593. | 638492. | 644255 |
| 200.00 | 616622. | 623583. | 629775. | 635764. | 641664. | 647427 |
| 201.00 | 619794. | 626754. | 632947. | 638936. | 644835. | 650599 |
| 202.00 | 622966. | 629926. | 636118. | 642108. | 648007. | 653770 |
| 203.00 | 626135. | 633097. | 639290. | 645280. | 651179. | 656942 |
| 204.00 | 629309. | 636269. | 642462. | 648451. | 654350. | 660114 |
| 205.00 | 632481. | 639441. | 645633. | 651623. | 657522. | 663286 |
| 206.00 | 635653. | 642612. | 648805. | 654795. | 660694. | 666457 |
| 207.00 | 638825. | 645784. | 651977. | 657967. | 663866. | 669629 |
| 208.00 | 641996. | 648956. | 655149. | 661138. | 667037. | 672801 |
| 209.00 | 645167. | 652128. | 658321. | 664310. | 670209. | 675972 |
| 210.00 | 648339. | 655299. | 661492. | 667482. | 673381. | 679144 |
| 211.00 | 651511. | 658471. | 664664. | 670654. | 676553. | 682316 |
| 212.00 | 654683. | 661643. | 667836. | 673826. | 679724. | 685488 |
| 213.00 | 657855. | 664815. | 671008. | 676997. | 682896. | 688660 |
| 214.00 | 661027. | 667986. | 674179. | 680169. | 686068. | 691831 |
| 215.00 | 664198. | 671158. | 677351. | 683341. | 689240. | 695003 |
| 216.00 | 667370. | 674330. | 680523. | 686512. | 692411. | 698175 |
| 217.00 | 670542. | 677502. | 683695. | 689684. | 695583. | 701347 |
| 218.00 | 673713. | 680673. | 686866. | 692855. | 698755. | 704518 |
| 219.00 | 676885. | 683845. | 690038. | 696027. | 701927. | 707690 |
| 220.00 | 680057. | 687017. | 693209. | 699199. | 705098. | 710861 |
| 221.00 | 683228. | 690189. | 696382. | 702371. | 708270. | 714033 |
| 222.00 | 686400. | 693360. | 699553. | 705543. | 711442. | 717205 |
| 223.00 | 689572. | 696532. | 702725. | 708714. | 714614. | 720377. |
| 224.00 | 692744. | 699704. | 705897. | 711886. | 717785. | 723549. |
| 225.00 | 695916. | 702876. | 709068. | 715058. | 720957. | 726720. |
| 226.00 | 699087. | 706047. | 712240. | 718230. | 724129. | 729892. |
| 227.00 | 702259. | 709219. | 715412. | 721401. | 727301. | 733064. |
| 228.00 | 705431. | 712391. | 718584. | 724573. | 730472. | 736236. |
| 229.00 | 708603. | 715563. | 721755. | 727745. | 733644. | 739407. |
| 230.00 | 711775. | 718734. | 724927. | 730917. | 736816. | 742579. |
| 231.00 | 714946. | 721906. | 728099. | 734089. | 739988.* | 745751. |
| 232.00 | 718118. | 725078. | 731271. | 737260. | 743159. | 748923. |
| 233.00 | 721289. | 728249. | 734442. | 740432. | 746331. | 752089. |
| 234.00 | 724461. | 731421. | 737614. | 743604. | 749503. | 755214. |
| 235.00 | 727633. | 734593. | 740786. | 746775. | 752674. | 758248. |
| 236.00 | 730805. | 737765. | 743958. | 749947. | 755846. | 761143. |
| 237.00 | 733976. | 740936. | 747129. | 753119. | 759018. | 763851. |
| 238.00 | 737148. | 744108. | 750301. | 756290. | 762190. | 766323. |
| 239.00 | 740320. | 747280. | 753473. | 759462. | 765361. | 768510. |
| 240.00 | 743452. | 750452. | 756644. | 762634. | 768533. | 770365. |

* INDICATES 90.0 PERCENT FULL

| GAUGE INCHES | STANDARD CUBIC FEET LIQUID AND VAPOR AT TANK PRESSURE OF | | | | | |
|---|---|---|---|---|---|---|
| | 0. PSIG | 50. PSIG | 100. PSIG | 150. PSIG | 200. PSIG | 250. PSIG |
| 241.00 | 746664. | 753623. | 759817. | 765806. | 771705. | 771837. |
| 242.00 | 749835. | 756795. | 762988. | 768977. | 774877. | 772680. |
| 243.00 | 753007. | 759967. | 766160. | 772149. | 778049. | 773445. |
| 244.00 | 756179. | 763139. | 769331. | 775321. | 781220. | OVERFULL |
| 245.00 | 759350. | 766310. | 772503. | 778493.* | 784392. | |
| 246.00 | 762522. | 769482. | 775675. | 781665. | 787563. | |
| 247.00 | 765694. | 772654. | 778847. | 784836. | 790712. | |
| 248.00 | 768866. | 775826. | 782018. | 788008. | 793799. | |
| 249.00 | 772037. | 778997. | 785190. | 791180. | 796764. | |
| 250.00 | 775209. | 782170. | 788362. | 794352. | 799625. | |
| 251.00 | 778381. | 785341. | 791534. | 797523. | 802284. | |
| 252.00 | 781552. | 788513. | 794706. | 800695. | 804718. | |
| 253.00 | 784725. | 791685. | 797877. | 803867. | 806886. | |
| 254.00 | 787896. | 794856. | 801049. | 807038. | 808752. | |
| 255.00 | 791068. | 798028. | 804221. | 810210. | 810271. | |
| 256.00 | 794240. | 801199. | 807393. | 813382. | 811403. | |
| 257.00 | 797411. | 804371. | 810564. | 816553. | 812108. | |
| 258.00 | 800583. | 807543. | 813736. | 819725. | OVERFULL | |
| 259.00 | 803755. | 810715. | 816908. | 822897. | | |
| 260.00 | 806926. | 813886. | 820079.* | 826069. | | |
| 261.00 | 810098. | 817058. | 823251. | 829240. | | |
| 262.00 | 813270. | 820230. | 826423. | 832390. | | |
| 263.00 | 816441. | 823402. | 829595. | 835487. | | |
| 264.00 | 819613. | 826573. | 832766. | 838497. | | |
| 265.00 | 822785. | 829745. | 835938. | 841384. | | |
| 266.00 | 825957. | 832917. | 839110. | 844115. | | |
| 267.00 | 829129. | 836089. | 842282. | 846655. | | |
| 268.00 | 832301. | 839260. | 845453. | 848971. | | |
| 269.00 | 835472. | 842432. | 848625. | 851028. | | |
| 270.00 | 838644. | 845604. | 851797. | 852791. | | |
| 271.00 | 841816. | 848776. | 854969. | 854228. | | |
| 272.00 | 844987. | 851947. | 858140. | 855302. | | |
| 273.00 | 848159. | 855119. | 861312. | 855981. | | |
| 274.00 | 851331. | 858291. | 864484. | 856230. | | |
| 275.00 | 854502. | 861463. | 867655. | OVERFULL | | |
| 276.00 | 857674. | 864635. | 870827. | | | |
| 277.00 | 860846. | 867806.* | 873998. | | | |
| 278.00 | 864018. | 870978. | 877152. | | | |
| 279.00 | 867190. | 874150. | 880260. | | | |
| 280.00 | 870361. | 877321. | 883293. | | | |
| 281.00 | 873533. | 880493. | 886223. | | | |
| 282.00 | 876705. | 883665. | 889019. | | | |
| 283.00 | 879877. | 886836. | 891653. | | | |
| 284.00 | 883048. | 890008. | 894096. | | | |
| 285.00 | 886220. | 893180. | 896318. | | | |
| 286.00 | 889391. | 896352. | 898291. | | | |
| 287.00 | 892563. | 899523. | 899985. | | | |
| 288.00 | 895735. | 902695. | 901371. | | | |
| 289.00 | 898907. | 905866. | 902420. | | | |
| 290.00 | 902079. | 909038. | 903104. | | | |
| 291.00 | 905250. | 912210. | 903392. | | | |
| 292.00 | 908422. | 915382. | OVERFULL | | | |
| 293.00 | 911593. | 918554. | | | | |
| 294.00 | 914765. | 921725. | | | | |
| 295.00 | 917936. | 924897. | | | | |

* INDICATES 90.0 PERCENT FULL

| GAUGE | STANDARD CUBIC FEET LIQUID AND VAPOR AT TANK PRESSURE OF | | | | | |
|---|---|---|---|---|---|---|
| INCHES | 0. PSIG | 50. PSIG | 100. PSIG | 150. PSIG | 200. PSIG | 250. PSIG |
| 296.00 | 921109. | 928069. | | | | |
| 297.00 | 924280. | 931229. | | | | |
| 298.00 | 927451. | 934356. | | | | |
| 299.00 | 930623. | 937424. | | | | |
| 300.00 | 933795. | 940409. | | | | |
| 301.00 | 936966. | 943285. | | | | |
| 302.00 | 940139. | 946029. | | | | |
| 303.00 | 943310. | 948615. | | | | |
| 304.00 | 946482. | 951020. | | | | |
| 305.00 | 949654. | 953219. | | | | |
| 306.00 | 952825. | 955186. | | | | |
| 307.00 | 955998.* | 956898. | | | | |
| 308.00 | 959169. | 958330. | | | | |
| 309.00 | 962341. | 959456. | | | | |
| 310.00 | 965513. | 960253. | | | | |
| 311.00 | 968684. | 960696. | | | | |
| 312.00 | 971855. | OVERFULL | | | | |
| 313.00 | 975028. | | | | | |
| 314.00 | 978199. | | | | | |
| 315.00 | 981371. | | | | | |
| 316.00 | 984543. | | | | | |
| 317.00 | 987714. | | | | | |
| 318.00 | 990867. | | | | | |
| 319.00 | 994058. | | | | | |
| 320.00 | 997230. | | | | | |
| 321.00 | 1000402. | | | | | |
| 322.00 | 1003574. | | | | | |
| 323.00 | 1006745. | | | | | |
| 324.00 | 1009917. | | | | | |
| 325.00 | 1013088. | | | | | |
| 326.00 | 1016260. | | | | | |
| 327.00 | 1019432. | | | | | |
| 328.00 | 1022604. | | | | | |
| 329.00 | 1025771. | | | | | |
| 330.00 | 1028917. | | | | | |
| 331.00 | 1032020. | | | | | |
| 332.00 | 1035064. | | | | | |
| 333.00 | 1038028. | | | | | |
| 334.00 | 1040893. | | | | | |
| 335.00 | 1043638. | | | | | |
| 336.00 | 1046245. | | | | | |
| 337.00 | 1048694. | | | | | |
| 338.00 | 1050967. | | | | | |
| 339.00 | 1053043. | | | | | |
| 340.00 | 1054903. | | | | | |
| 341.00 | 1056529. | | | | | |
| 342.00 | 1057900. | | | | | |
| 343.00 | 1058996. | | | | | |
| 344.00 | 1059807. | | | | | |
| 345.00 | 1060290. | | | | | |
| 346.00 | OVERFULL | | | | | |

* INDICATES 90.0 PERCENT FULL

APPENDIX 2 for METHOD AND SYSTEM
FOR MEASUREMENT OF LIQUID LEVEL
IN A TANK, by Ferretti, et al.

222-P-US03024

```
        PUBLIC INI

EXTRN CODE(INDATA,ANSWER,CHKSET,DISPLY,EXIT,SO,CLEAR,WAIT)
        EXTRN CODE(DIALIN)
        EXTRN DATA(MCOUNT,SCOUNT,HCOUNT,CNTRHI)
        EXTRN BIT(MINFLG,CTS,CALBIT,RXFLG,MODE,DTR,OUTFLG,DIAL)
        EXTRN BIT(BRNDNEW,NOANS,ASCODE)

TMAIN1 SEGMENT CODE
        RSEG TMAIN1

USING 0

INI:MOV SP,#60H
            CLR IE.7              ;DI
            MOV P1,#70H           ;
            MOV TMOD,#21H         ;SET UP TIMERS
```

```
        MOV TCON,#45H           ;TIMER CONTROL
        MOV TH1,#0DCH           ;-52 @ 6MHZ, DCH @ 4.19MHZ, 300 BAUD
        SETB TR1                ;ENABLE TIMER 1
        MOV SCOUNT,#00          ;CLEAR SCOUNT
        MOV HCOUNT,#00          ;CLEAR HCOUNT
        MOV HCOUNT,#00          ;CLEAR HCOUNT
        MOV CNTRHI,#00          ;CLEAR HIGH COUNTER
        MOV SCON,#50H           ;SET UART
        MOV IP,#00H             ;INTERRUPT PRIORITY
        MOV IE,#15H             ;ENABLE SERIAL UART
        clr p1.0                ;clock enable
        mov dptr,#201bh         ;load dptr with msb saved water column fp
        movx a,@dptr            ;load acc. with contents of dptr
        clr c                   ;clear carry flag
        subb a,#41h             ;subtract 41H from acc.
        jc olevel               ;if no carry , level ok
        clr a                   ;clear acc.
        mov dptr,#2018          ;load dptr with saved water column fp
        movx @dptr,a            ;save acc. in dptr location;
        inc dptr                ;next location
        movx @dptr,a            ;save acc. in dptr location
        inc dptr                ;next location
        mov a,#0c8h             ;load acc. with next fp constant
        movx @dptr,a            ;save acc. in dptr location
        inc dptr                ;next location
        mov a,#041h             ;load acc. with msb fp constant
        movx @dptr,a            ;save acc. in dptr location
        setb p1.0               ;disable clock;
olevel: MOV DPTR,#200AH         ;CLOCK ADDRESS
        MOV A,#0FH              ;
        CLR P1.0                ;ENABLE CLOCK
        MOVX @DPTR,A            ;
        INC DPTR                ;
        MOV A,#09BH             ;STOP CLOCK, UIE INTERRUPT
        MOVX @DPTR,A            ;
        INC DPTR                ;
        MOVX A,@DPTR            ;CLEAR CLOCK INTERRUPTS
        MOVX @DPTR,A            ;
        INC DPL                 ;
        INC DPL                 ;MINUTES ALARM ADDRESS
        MOVX @DPTR,A            ;SET MINUTE INTERRUPT
        INC DPL                 ;
        INC DPL                 ;HOURS ALARM ADDRESS
        MOVX @DPTR,A            ;SET MINUTE INTERRUPT
        SETB P1.0               ;DISABLE CLOCK
        CLR DTR                 ;CLEAR DTR
        SETB MODE               ;SET MODE AS ANSWER
        SETB DIAL               ;SET DIAL
        MOV 23H,#00H            ;CLEAR FLAGS
        MOV 24H,#00H            ;CLEAR FLAGS
        MOV 25H,#00H            ;CLEAR FLAGS
        MOV 26H,#00H            ;CLEAR FLAGS
        SETB OUTFLG             ;SET UART TX FLAG
        SETB BRNDNEW            ;SET BRANDNEW DATA BIT
        ;START CLOCK
STRCLK: MOV DPTR,#200BH         ;
        MOV A,#1BH              ;START CLOCK, UIE INTERRUPT
        CLR P1.0                ;ENABLE CLOCK
        MOVX @DPTR,A            ;
        INC DPL                 ;
        MOVX A,@DPTR            ;CLEAR CLOCK INTERRUPTS
        SETB P1.0               ;DISABLE CLOCK
        SETB IE.7               ;ENABLE INTERRUPTS
        MOV R5,#5H              ;LOAD R5 WITH COUNT
        MOV A,#0F0H             ;SHORT BEEP CODE
HOPY:   CALL SB                 ;OUTPUT SHORT BEEP
        DJNZ R5,HOPY            ;REPEAT FIVE TIMES
```

```
        CALL CLEAR          ;CLEAR LCDS AND LEDS
        SETB MINFLG         ;SET MINUTE FLAG
        MOV R5,#20H         ;LOAD R5 WITH 32
        CALL WAIT           ;WAIT FOR 32 SECONDS
        SETB CALBIT         ;SET CALLED BIT

MAIN:   JNB MINFLG,NOPUT    ;INPUT NEW DATA
        CALL INDATA         ;UPDATE DATA
        CALL CHKSET         ;CHECK SETPOINTS WITH DATA
NOPUT:  JB CTS,HOP          ;IF CTS HIGH, NO PHONE CALL
        CALL ANSWER         ;ANSWER PHONE
HOP:    JNB RXFLG,FIN       ;IF NO KEY INTERRUPT,CONTINUE
        CALL DISPLY         ;USE DISPLAY
FIN:    JNB ASCODE,YIT      ;NOT KEYBOARD NOT ACTIVE,SKIP
        MOV A,HCOUNT        ;LOAD ACC. WITH MINUTES COUNT
        CJNE A,#05H,YIT     ;IF LESS THAN FIVE MINUTES,CONTINUE
        CALL EXIT           ;EXIT DISPLAY MODE
YIT:    JNB NOANS,ZIT       ;IF NO-ANSWER FLAG THEN CHECK FOR
        MOV A,HCOUNT        ;5 MINUTE TIMEOUT PERIOD
        CJNE A,#05H,ZIT     ;IF LESS THEN 5-MINUTES, CONTINUE
        CALL DIALIN         ;IF 5 MINUTES, CALL HQ
        CLR NOANS           ;CLEAR NO-ANSWER FLAG
ZIT:    JNB CALBIT,XIT      ;CHECK FOR NO ANSWER FLAG
        MOV A,HCOUNT        ;LOAD ACC. WITH ONE HOUR COUNT
        CJNE A,#3CH,XIT     ;COMPARE HCOUNT WITH 60 MINUTES
        CLR CALBIT          ;CLEAR CALLED BIT
XIT:    JMP MAIN            ;RETURN TO MAIN

;
END
$DEBUG
;*************************************************************
;       ;TTONE.A51   ONE TANK SUB-ROUTINES
;       ;KKM  4/12/84   INSERTION MADE 7/18/84 KKM
;*************************************************************

PUBLIC ANSWER,MXPRES,TNKNO1,TNKNO2,TNKTST,TEMP,PRES,WITTNK
    PUBLIC DATOUT,CHKSET,INDATA,DISGAL,MESS,MES14,MES15,MES13
    PUBLIC MES16,HITDAT

EXTRN CODE(PICKUP,LFCR,MSEND,HANGUP,BINHEX,OUTNUM)
    EXTRN CODE(STPNTRS,GETINT,SBINBCD,CRMFNT,SPACES)
    EXTRN CODE(GETEMP,GETINT1,MOMOUT,SO,MULF5,CHKTNK)
    EXTRN CODE(SETOUT,ASCBCD,CLEAR,ACCESS,LITLED,FORDAT)
    EXTRN CODE(MULF4,TANKL1,TANKL2,SCLOCK,MES1,MES3,OUTTIM,LODTIM)
    EXTRN CODE(SCAN,MOVOUT,MOVWRDS,PRESS,WCRUTE,THERMO,RATCAL)
    EXTRN CODE(GETANK,DIALIN,LEDOUT,PRSCHK,HIPT1,LOWPT1)
    EXTRN BIT(CTS,TIMOUT,IEASET,TANK1,DUMB,BRNDNEW)
    EXTRN BIT(ADFLG,TNK1,TNK2,NOTANK,MINFLG,CALBIT,NOANS)
    EXTRN BIT(LOPRS1,TCALL1,BTANK1,CNTFLG,DPRES,DIFBIT)
    EXTRN DATA(BUFF1,CHNUM,RESETS,MIN,HOUR,DATE,TRYCNT)
    EXTRN DATA(ANABAS,TANKNO,CNTRLO,CNTRHI)

TTONE SEGMENT CODE
    RSEG TTONE

USING 0

;********************
;********************
    ;OUTPUTS TANK DATA TO MODEM AND CHECKS FOR TANK MESSAGES
    ; AND OUTPUTS THESE MESSAGES TO MODEM
    ;SUBS: DATOUT,CHKTNK
    ;CLEARS NOANS
```

```
;*********
HITDAT:CALL DATOUT          ;OUTPUTS TANK DATA TO MODEM
       CALL CHKTNK          ;OUTPUTS TANK MESSAGES TO MODEM
       CLR NOANS            ;CLEAR NOANS BIT
       RET

;********************
;********************
   ;ANSWERS THE PHONE AND OUTPUTS DATA AND MESSAGES
   ;ALSO CHECKS FOR PROPER INPUT CODE
   ;SUBS: PICKUP,DATOUT,MOMOUT,BINHEX,STPNTRS,GETINT,GETPNT3
   ;SUBS: MXPRES,HANGUP,SETCLK
   ;USES *TIMOUT* AS A TIME OUT FLAG
   ;USES *IEASET* AS A IEAS CALLED FLAG
   ;USES *TANK1* AS TANK 1 LOW FLAG
   ;USES *CHNUM* AS CHENNEL NUMBER LOCATION
   ;USES *TRYCNT* AS NUMBER OF TRIES

;**********
ANSWER:MOV TRYCNT,#03H      ;LOAD 08 WITH NUMBER OF TRIES
       CALL PICKUP          ;ANSWER PHONE AND INPUT DATA
       JBC TIMOUT,NOGO      ;IF TIMOUT BIT SET, HANGUP
       JB CTS, NOGO         ;IF CTS SET, END AND R
       MOV R0,#BUFF1        ;LOAD R0 WITH ADDRESS OF INPUTTED DATA
       CJNE @R0,#'L',IEAS   ;CHECK IF CHARACTER IS 'L'
       INC R0               ;NEXT ADDRESS
       CJNE @R0,#'I',SHORT  ;CHECK IF CHARACTER IS 'I'
       INC R0               ;NEXT ADDRESS
       CJNE @R0,#'Q',SHORT  ;CHECK IF CHARACTER IS 'Q'
       INC R0               ;NEXT ADDRESS
       CJNE @R0,#0DH,LF     ;CHECK IF CHARACTER IS CARRIAGE RETURN
       JMP HIT              ;JUMP TO HIT
LF:    CJNE @R0,#0AH,SHORT  ;CHECK IF CHARACTER IS LINE FEED
HIT:   SETB DUMB            ;SET DUMB TERMINAL FLAG
       CALL HITDAT          ;OUTPUT TANK DATA TO MODEM
NOGO:  CALL HANGUP          ;HANGUP PHONE
       RET
SHORT: DJNZ TRYCNT,TRY      ;IF 0SH>0, TRY AGAIN
       CALL LFCR            ;OUTPUT LINE FEED, CARRIAGE RETURN
       MOV DPTR,#MES6       ;MESSAGE 6 ADDRESS
       CALL MOMOUT          ;OUTPUT MESSAGE 2
       JMP NOGO             ;HANGUP AND RETURN
IEAS:  CJNE @R0,#'I',SHORT  ;CHECK FOR 'I' CHARACTER
       INC R0               ;NEXT CHARACTER
       CJNE @R0,#'E',SHORT  ;CHECK FOR 'E' CHARACTER
       INC R0               ;NEXT CHARACTER LOCATION
       CJNE @R0,#'A',SHORT  ;CHECK FOR 'A' CHARACTER
       INC R0               ;NEXT CHARACTER LOCATION
       CJNE @R0,#'S',SHORT  ;CHECK FOR 'S' CHARACTER
       INC R0               ;NEXT CHARACTER LOCATION
       CJNE @R0,#0DH,LF2    ;CHECK FOR CARRIAGE RETURN
       JMP HIT2             ;JUMP TO HIT 2
LF2:   CJNE @R0,#0AH,SHORT  ;CHECK FOR LINE FEED
HIT2:  CALL HITDAT          ;OUTPUT TANK DATA TO MODEM
       MOV DPTR,#MES11      ;LOAD DPTR WITH MES11
       CALL MOMOUT          ;OUTPUT MESSAGE
       MOV DPTR,#HIPT1      ;LOAD DPTR WITH SETPOINT1
       CALL SETOUT          ;OUTPUT SETPOINTS
       INC DPTR             ;NEXT LOCATION
       CALL SETOUT          ;OUTPUT SETPOINT
       CALL LFCR            ;OUTPUT CARRIAGE RETURN, LINE FEED
       MOV DPTR,#MES19      ;LOAD DPTR WITH MESSAGE 19 ADDRESS
       CALL MOMOUT          ;OUTPUT MESSAGE
       MOV DPTR,#LOWPT1     ;LOAD DPTR WITH LOW SETPOINT ADDRESS
```

```
        CALL SETOUT           ;OUTPUT SETPOINT
        INC DPTR              ;NEXT LOCATION
        CALL SETOUT           ;OUTPUT SETPOINT
        CALL LFCR             ;CARRIAGE RETURN, LINE FEED
        MOV DPTR,#MES8        ;LOAD DPTR WITH ADDRESS OF MES8
        CALL MOMOUT           ;OUTPUT MESSAGE
        MOV CHNUM,#0H         ;LOAD CHANNEL NUMBER 0
        MOV A,#1H             ;LOAD ACC. WITH TANK NUMBER
        CALL BINHEX           ;OUTPUT TANK NUMBER
        CALL SPACES           ;OUTPUT SPACES
        CALL MXPRES           ;MAX AND MIN PRESSURES AND TIMES
        MOV DPTR,#MES7        ;LOAD DPTR WITH ADDRESS OF MES7
        CALL MOMOUT           ;OUTPUT MESSAGE
        MOV CHNUM,#2H         ;LOAD CHNUM WITH CHANNEL 2
        CALL GETEMP           ;CALCULATE TEMPERATURE
        CALL OUTNUM           ;OUTPUT TEMPERATURE
        CALL LFCR             ;LINE FEED,CARRIAGE RETURN
        MOV DPTR,#MES9        ;LOAD DPTR WITH ADDRESS OF MES9
        CALL MOMOUT           ;OUTPUT MESSAGE
        MOV DPTR,#RESETS      ;LOAD DPTR WITH RESETS LOCATION
        MOVX A,@DPTR          ;LOAD MAX TANK NUMBER OF
        XCH A,B               ;EXCHANGE ACC. AND B
        MOVX @DPTR,A          ;CLEAR NUMBER OF RESETS
        SETB P1.0             ;DISABLE CLOCK RAM
        XCH A,B               ;LOAD A WITH NUMBER OF RESETS
        CALL BINHEX           ;OUTPUT NUMBER OF RESETS
        CALL LFCR             ;OUTPUT LINE FEED, CARRIAGE RETURN
        JNB ADFLG, XTRY       ;IF NOT A/D FLAG, SKIP
        CLR ADFLG             ;CLEAR A/D FLAG
        MOV DPTR,#MES12       ;LOAD DPTR WITH ADDRESS OF MES12
        CALL MOMOUT           ;OUTPUT MESSAGE
        CALL LFCR             ;LINE FEED,CARRIAGE RETURN
XTRY:   MOV R5,#1H            ;LOAD R5 WITH COUNT
        CALL PICKUP           ;SEND OUT CARROT AND GET MORE INPUT
        JBC TIMOUT,NOGO1      ;NOGO IF TIMED OUT
        JB CTS,NOGO1          ;NOGO IF HUNG UP
        MOV R0,#BUFF1         ;LOAD R0 WITH BUFFER ADDRESS
        MOV A,@R0             ;INPUT FIRST CHARACTER
        CJNE A,#12H,INSTIM    ;CHECK IF REPEAT OUTPUT
        JMP HIT2              ;JUMP TO HIT2
INSTIM: CJNE A,#14H,NOGO1     ;CHECK IF SET TIME CODE
        MOV DPTR,#MES10       ;LOAD DPTR WITH ADDRESS OF MES10
        CALL MOMOUT           ;OUTPUT MESSAGE
        CALL LFCR             ;OUTPUT LINE FEED, CARRIAGE RETURN
        MOV R5,#01H           ;LOAD R5 FOR ONE SECOND
        CALL PICKUP           ;SEND OUT CARROT AND INPUT DATA
        JBC TIMOUT,NOGO1      ;CHECK FOR TIME OUT FLAG
        JB CTS,NOGO1          ;CHECK FOR HANG UP
        MOV R0,#BUFF1         ;LOAD R0 WITH BUFFER ADDRESS
        MOV DPTR,#MIN         ;LOAD DPTR WITH MINUTE ADDRESS
        CALL ASCBCD           ;SET MINUTES
        MOV DPTR,#HOUR        ;LOAD DPTR WITH HOUR ADDRESS
        CALL ASCBCD           ;SET HOUR
        MOV DPTR,#DATE        ;LOAD DPTR WITH DATE ADDRESS
        CALL ASCBCD           ;SET DATE
        INC DPL               ;LOAD DPTR WITH MONTH ADDRESS
        CALL ASCBCD           ;SET MONTH
        INC DPL               ;LOAD DPTR WITH YEAR ADDRESS
        CALL ASCBCD           ;LOAD YEAR
        JMP XTRY              ;JUMP TO XTRY
NOGO1:  CALL HANGUP           ;HANG UP PHONE
        RET

MES2: DB '   TANK TYPE        PSIG           W.C.',0DH,0AH,0FFH
MES5: DB '   WARNING - TANK AT FIRST SETPOINT',0DH,0AH,0FFH
MES6: DB 'ILLEGAL ACCESS ',0DH,0AH,0FFH
MES7: DB 'TEMP.   ',0FFH
```

```
MES8:   DB ' TANK MAX AND MIN PRES. WITH TIMES',0DH,0AH,0FFH
MES9:   DB 'NO. OF RESETS   ',0FFH
MES10:  DB '  ENTER TIME AS MIN,HR,DATE,MONTH,YR (2 DIGITS EACH)',0DH,0AH,0F
MES11:  DB      'HIGH SETPOINT    ',0FFH
MES12:  DB      'A/D OUT OF ORDER ',0FFH
MES13:  DB      '         AT TIME OF ',0FFH
MES14:  DB      0DH,0AH,' ALERT - TANK AT MINIMIUM SETPOINT - ALERT',0DH,0
MES15:  DB      ODH,0AH,' ALERT - TANK AT MINIMUM SETPOINTS',0DH,0AH,0FFH
MES16:  DB ' INCHES PER HOUR USAGE BETWEEN SETPOINTS',0DH,0AH,0FFH
MES19:  DB      ' TANK LOW PRESSURE  MAINTENANCE PROBLEM',0DH,0AH,0FFH
        DB 'LOW SETPOINT    ',0FFH

;*******************
;*******************
;   OUTPUTS MAX AND MIN PRESSURES OF A CHANNEL NUMBER
;   ALSO OUTPUTS TIME OF EACH
;*******

MXPRES:     CLR P1.0            ;ENABLE CLOCK
            CALL GETINT         ;MAX. PRESSURE
            SETB P1.0           ;DISABLE CLOCK
            XCH A,B             ;EXCHANGE ACC. AND B
            CALL SBINBCD        ;FP TO PACKED BCD CONVERSION
            MOV 1BH,1CH         ;LOAD 1B WITH 1C DATA
            MOV 1CH,1DH         ;LOAD 1C WITH 1D DATA
            MOV 1DH,#00H        ;CLEAR 1D DATA
            CALL OUTNUM         ;OUTPUT MAX. PRESSURE
            INC DPTR
            CALL SPACES         ;OUTPUT SPACES
            CLR P1.0            ;ENABLE CLOCK
            CALL GETINT1        ;HR IN ACC.,MIN. IN B
            SETB P1.0           ;DISABLE CLOCK
            MOV R7,B            ;SAVE MINUTES IN R7
            CALL BINHEX         ;OUTPUT HOURS
            MOV A,#':'          ;COLON ASCII CODE
            CALL MSEND          ;OUTPUT COLON
            MOV A,R7            ;LOAD ACC. WITH MINUTES
            CALL BINHEX         ;OUTPUT MINUTES
            INC DPTR
            CALL SPACES         ;OUTPUT SPACES
            CLR P1.0            ;ENABLE CLOCK
            CALL GETINT1        ;MIN. PRESSURE
            SETB P1.0           ;DISABLE CLOCK
            XCH A,B             ;EXCHANGE ACC. AND B
            CALL SBINBCD        ;FP TO INTERGER CONVERSION
            MOV 1BH,1CH         ;LOAD 1B WITH 1C DATA
            MOV 1CH,1DH         ;LOAD 1C WITH 1D DATA
            MOV 1DH,#00H        ;CLEAR 1D
            CALL OUTNUM         ;OUTPUT MIN. PRESSURE
            INC DPTR
            CALL SPACES         ;OUTPUT SPACES
            CLR P1.0            ;ENABLE CLOCK
            CALL GETINT1        ;HR. IN ACC.,MIN. IN B
            SETB P1.0           ;DISABLE CLOCK
            MOV R7,B            ;SAVE MINUTES IN R7
            CALL BINHEX         ;OUTPUT HOURS
            MOV A,#':'          ;ASCII COLON CODE
            CALL MSEND          ;OUTPUT COLON
            MOV A,R7            ;LOAD ACC. WITH MINUTES
            CALL BINHEX         ;OUTPUT MINUTES
            CALL LFCR           ;LINE FEED, CARRIAGE RETURN
            SETB BRNDNEW        ;SET BRANDNEW DATA FLAG
            RET

;*******************
;*******************
```

```
;TANK CODE

;*********

TNKNO1: CLR TNK2             ;CLEAR TANK 2 FLAG
        SETB TNK1            ;SET TANK 1 FLAG
        MOV CHNUM,#1H        ;LOAD CHANNEL NUMBER ONE
        JMP SETUP            ;JUMP TO SET LEDS

SETUP:  CLR NOTANK           ;CLEAR NO TANK FLAG
        CALL CLEAR           ;CLEAR LCDS AND LEDS
        CALL ACCESS          ;LIGHT ACCESS LED
        CALL LITLED          ;
        CALL STPNTRS         ;CALCULATE POINTERS FOR CHANNEL NUMBER
        CALL MULFA           ;CALCULATE WATER COL. N
        CALL BINBCD          ;FP TO BCD CONVERSION
        MOV A,#0F6H          ;RIGHT LCD CODE
        CALL SO              ;OUTPUT LCD CODE
        MOV A,1CH            ;LOAD ACC. WITH HIGH BYTE DATA
        CALL SO              ;OUTPUT DATA
        MOV A,1DH            ;LOAD ACC. WITH LOW BYTE DATA
        ANL A,#0F0H          ;MASK OFF LOW NIBBLE
        ORL A,#03H           ;IN. WC. LABEL
        CALL SO              ;OUTPUT DATA
TNKNO2: RET

;**************
;**************
;TESTS IF A TANK NUMBER KEY WAS PRESSED

;*********

TNKTST: JB TNK1,TST3         ;CHECK FOR TANK NO. 1 FLAG
        SETB NOTANK          ;SET NO TANK FLAG
TST3:   RET

;**************
;**************
;OUTPUTS TEMPERATURE TO LCDS

;*******

TEMP:   CALL TNKTST          ;CHECK FOR TANK NUMBER
        JNB NOTANK,TEMP1     ;IF NO TANK NUMBER,RETURN
        RET
TEMP1:  CALL CLEAR           ;CLEAR LCDS AND LEDS
        CALL LITTNK          ;LIGHT CORRECT TANK LED
        CALL ACCESS          ;LIGHT ACCESS LED
        CALL LITLED          ;LIGHT FUNCTION LED
        MOV CHNUM,#2H        ;LOAD CHNUM WITH CHANNEL NUMBER
        CALL GETEMP          ;CALCULATE TEMPERATURE
        MOV B,1BH            ;LOAD B WITH DATA AT 1B
        MOV R0,1CH           ;LOAD R0 WITH DATA AT 1C
        CALL FORDAT          ;FORMAT DATA FOR DISPLAY
        MOV A,#0F6H          ;RIGHT LCD CODE
        CALL SO              ;OUTPUT CODE
        MOV A,B              ;LOAD ACC. WITH B DATA
        CALL SO              ;OUTPUT CODE
        MOV A,R0             ;LOAD ACC. WITH R0 DATA
        CALL SO              ;OUTPUT CODE
        RET

;*************
;*************
;OUTPUTS PRESSURE AND WC. TO LCDS
```

```
;*******

PRES:    CALL TNKTST            ;CHECK FOR TANK NUMBER
         JNB NOTANK,PRES1       ;IF NO TANK NUMBER,RETURN
         RET
PRES1:   CALL CLEAR             ;CLEAR LCDS AND LEDS
         CALL ACCESS            ;LIGHT ACCESS LED
         CALL WITTNK            ;LIGHT CORRECT TANK LED
         CALL LEDOUT            ;LIGHT FUNCTION LED
         CLR A                  ;CLEAR ACC.
POUT:    MOV CHNUM,A            ;LOAD CHANNEL NUMBER TO CHNUM
         CALL PRSCHK            ;CALCULATE PRESSURE AND CHECK FOR LOW
         JNC FINE               ;IF NO CARRY SKIP
         MOV A,#0F4H            ;BLINK LED FOUR
         CALL LEDOUT            ;OUTPUT LED CODE
FINE:    MOV B,1BH              ;LOAD B WITH 1B DATA
         MOV R0,1CH             ;LOAD R0 WITH 1C DATA
         CALL FORDAT            ;FORMAT DATA
         MOV A,#0F6H            ;WRITE TO RIGHT LCD CODE
         CALL SO                ;OUTPUT CODE
         MOV A,B                ;LOAD ACC. WITH HIGH BYTE DATA
         CALL SO                ;OUTPUT DATA
         MOV A,R0               ;LOAD ACC. WITH LOW BYTE DATA
         ORL A,#0DH             ;OR WITH PSIG LABEL
         CALL SO                ;OUTPUT DATA
         RET

;**************
;**************
;LIGHTS CORRECT TANK LED

;*******

WITTNK:  CALL TANKL1            ;LIGHT TANK 1 LED
         RET

;****************
;****************
;OUTPUTS CLOCK DATA TWICE AND TWO TANKS DATA
;PRESSURE AND DIFFERENTIAL PRESSURE
;USES R7 AS A COUNTER
;USES *CHNUM* AS CHANNEL NUMBER LOCATION
;DESTROYS ACC.,R7,DPTR
;SUBS: SCLOCK,MOMOUT,STPNTRS,BINHEX,GETANK
         ;********

DATOUT:  MOV R7,#1H             ;LOAD R7 WITH TWO
         JBC DUMB,RAPOUT        ;CHECK FOR DUMB TERMINAL
         INC R7                 ;LOAD R7 WITH 2
RAPOUT:  MOV DPTR,#MIN          ;LOAD DPTR WITH MINUTES ADDRESS
         CALL SCLOCK            ;OUTPUT MINUTES TO MODEM
         INC DPL                ;NEXT CLOCK LOCATION
         INC DPL                ;HOURS CLOCK LOCATION
         CALL SCLOCK            ;OUTPUT HOURS TO MODEM
         MOV DPTR,#DATE         ;LOAD DPTR WITH DATE ADDRESS
         CALL SCLOCK            ;OUTPUT DATE TO MODEM
         INC DPL                ;MONTH LOCATION
         CALL SCLOCK            ;OUTPUT MONTH TO MODEM
         INC DPL                ;YEAR LOCATION
         CALL SCLOCK            ;OUTPUT YEAR TO MODEM
         CALL LFCR              ;LINE FEED, CARRIAGE RETURN
         DJNZ R7,RAPOUT         ;REPEAT CLOCK OUTPUT TWICE
         MOV DPTR,#MES1         ;LOAD DPTR WITH ADDRESS OF MES1
         CALL MOMOUT            ;OUTPUT FIRST MESSAGE
         MOV DPTR,#MES2         ;LOAD DPTR WITH ADDRESS OF MES2
         CALL MOMOUT            ;OUTPUT SECOND MESSAGE
```

```
        CLR A                   ;CLEAR ACC.
        MOV CHNUM,A             ;LOAD CHNUM WITH CHANNEL 0
        MOV DPTR,#MES3          ;LOAD DPTR WITH ADDRESS OF MES3
        MOV TANKNO,#0FFH        ;LOAD TANKNO WITH 0FFH

;*****************
;*****************
;COMPARES WATER COLUMN WITH SETPOINTS, AND CALLS T-TOWN
;IF LEVEL IS BELOW HIGHPOINT1 OR LOWPOINT1
;USES *CHNUM* AS LOCATION OF CHANNEL
;*HIPT1* IS CHANNEL 1 FIRST SETPOINT LOCATION,2 BYTES,HI-LOW
    ;*LOWPT1* IS CHANNEL 1 SECOND SETPOINT LOCATION, 2 BYTES,HI-LOW
;*TANKLO* IS LOW TANK LEVEL FLAG
;*TANK1* IS TANK1 LOW LEVEL FLAG
        ;*BTANK1* IS TANK1 BOTTOM LEVEL FLAG
        ;*CNTFLG* IS RATE COUNTER'S FLAG BIT
        ;*TCALL1* IS LOW TANK1 CALL FLAG
;DESTROYS ACC.,C-BIT,DPTR
;SUBS: MULF4,SBINBCD,STPNTRS,DIALIN
        ;*********

CHKSET: MOV CHNUM,#1H           ;CHANNEL 1
        CALL STPNTRS            ;POINTERS CALCULATION
        CALL MULF4              ;GET W.C. OF CHANNEL 1
        CALL SBINBCD            ;FP TO PACKED BCD CONVERSION
        CLR A                   ;CLEAR ACC.
        CLR C                   ;CLEAR CARRY
        MOV DPTR,#HIPT1         ;CHANNEL ONE HIGH SETPOINT
        MOVC A,@A+DPTR          ;LOAD HIGH BYTE OF HIGH SETPOINT
        SUBB A,1CH              ;COMPARE HIGH SETPOINT WITH DATA
        JC ABOVE1               ;IF CARRY, ABOVE HIGH SETPOINT
        JNZ BELOW1              ;IF NOT 0, THEN BELOW HIGH SETPOINT
        MOV A,#1H               ;LOAD A WITH ONE
        MOVC A,@A+DPTR          ;LOAD LOW BYTE OF HIGH SETPOINT
        SUBB A,1DH              ;COMPARE HIGH SETPOINT WITH DATA
        JC ABOVE1               ;IF CARRY, ABOVE HIGH SETPOINT
BELOW1: JNB TANK1,LOWSET        ;CHECK IF TANK1 BIT WAS SET
        JB BTANK1,TRYCAL        ;CHECK IF BTANK1 BIT WAS SET
        CLR A                   ;CLEAR ACC.
        CLR C                   ;CLEAR CARRY
        MOV DPTR,#LOWPT1        ;CHANNEL ONE LOW SETPOINT
        MOVC A,@A+DPTR          ;LOAD HIGH BYTE OF LOW SETPOINT1
        SUBB A,1CH              ;COMPARE LOW SETPOINT WITH DATA
        JC TRYCAL               ;DATA GREATER THAN LOW SETPOINT
        JNZ BELOW2              ;DATA LESS THAN LOW SETPOINT
        MOV A,#1H               ;LOAD ACC. WITH ONE
        MOVC A,@A+DPTR          ;LOAD LOW BYTE OF LOW SETPOINT
        SUBB A,1D               ;COMPARE DATA WITH LOW SETPOINT
        JC TRYCAL               ;DATA GREATER THAN LOW SETPOINT
BELOW2: SETB BTANK1             ;SET BOTTOM TANK 1 FLAG
        CLR CNTFLG              ;STOP RATE TIME COUNTER
        CALL LODTIM             ;SAVE TIME OF SETPOINT SETTING
        CALL DIALIN             ;CALL HQ
        RET
LOWSET: CLR A                   ;CLEAR ACC.
        MOV CNTRHI,A            ;CLEAR HIGH BYTE OF RATE COUNTER
        MOV CNTRLO,A            ;CLEAR LOW BYTE OF RATE COUNTER
        SETB CNTFLG             ;START RATE TIME COUNTER
        SETB TANK1              ;SET TANK1 LOW FLAG
        CALL LODTIM             ;SAVE TIME OF SETPOINT SETTING
        CALL DIALIN             ;CALL HQ
        RET
ABOVE1: CLR BTANK1              ;CLEAR BOTTOM TANK FLAG
        CLR TANK1               ;CLEAR LOW TANK FLAG
TRYCAL: JB CALBIT,SETFIN        ;IF ALREADY CALLED, JUMP TO END
        JB NOANS,SETFIN         ;IF NO-ANSWER, JUMP TO END
        MOV C,TANK1             ;LOAD CARRY WITH TANK1 FLAG
```

```
            CALL DIALIN           ;CALL T-TOWN
SETFIN: RET                       ;RETURN
```

```
;***************
;***************
;INPUTS ALL EIGHT CHANNELS AND CALCULATES RESULTS
;DESTROYS R1,R2,R7,ACC.
;USES *CHNUM* TO CONTAIN CHANNEL NUMBER
;USES *MINFLG* FOR ONE MINUTE INTERRUPT FLAG
;USES *ANABAS* FOR LOCATION OF ANALOG INPUTS
;USES *BUFF1* AS TEMPORARY INTERNAL MEMORY LOCATIONS
;SUBS: SCAN,MOVOUT,MOVWRDS,PRESS,WCRUTE,THERMO
       ;*********

INDATA: MOV R7,#2H           ;LOAD R7 WITH COUNT
NULOP:  MOV R1,#08H          ;LOAD R1 WITH NUMBER OF CHANNELS
        MOV R2,#00H          ;LOAD R2 WITH CHANNEL 0
        CALL SCAN            ;INPUT DATA FROM ALL CHANNELS
        DJNZ R7,NULOP        ;CHECK IF R7 ZERO
        MOV R7,#10H          ;LOAD NUMBER OF BYTES TO MOVE
        MOV R0,#BUFF1        ;LOAD R0 WITH LOCATION OF DATA
        MOV DPTR,#ANABAS     ;LOAD DPTR WITH END LOCATION
        CALL MOVOUT          ;MOVE DATA FROM INTERNAL TO EXTERNAL
        CALL MOVWRDS         ;MOVE ANALOG DATA TO FP ARRAYS
        MOV CHNUM,#0H        ;CHANNEL 0
        CALL PRESS           ;CALCULATE PRESSURE FOR CHANNEL 0
        CLR LOPRS1           ;CLEAR LOW PRESSURE ONE FLAG
        CALL PRSCHK          ;CHECK FOR LOW PRESSURE
        MOV LOPRS1,C         ;MOV CARRY INTO LOPRS1
        INC CHNUM            ;CHANNEL 1
        CALL WCRUTE          ;CALCULATE WATER COLUMN FOR CHANNEL 1
        INC CHNUM            ;CHANNEL 2
        CALL STPNTRS         ;CALCULATE POINTERS
        CALL THERMO          ;CALCULATE TEMPERATURE FOR CHANNEL 2
        CLR MINFLG           ;CLEAR MINUTE FLAG
        CLR BRNDNEW          ;CLEAR BRANDNEW FLAG
        RET
```

```
;**************
;DISPLAYS GALLONS (NOT AVAILABLE)
       ;******

DISGAL: RET

;
END
;DEBUG
;***********************************************************
                ;TSUB1.A51 MAIN SUB-ROUTINES
                ;KKM 7/19/84
                ;REPAIRED 16APR84 MDF  REFINED DIALD (PHONE # CAN BE ASC
;***********************************************************

PUBLIC SPACES,MOMOUT,ASCBCD,SETOUT,RXINT,SO,RTC,RESPON
  PUBLIC MOVOUT,DIALIN,FULSET,BINHEX

EXTRN CODE(LFCR,MSEND,HANGUP,HITDAT)
  EXTRN CODE(SETCLK,PHNUM,WAIT,MS40,MS60)
  EXTRN BIT(CTS,CALBIT,TANK1,DUMB,MODE,NOANS,DIAL,MSFLG)
  EXTRN BIT(RXFLG,MINFLG,CNTFLG)
  EXTRN DATA(CHAR,SCOUNT,MCOUNT,HCOUNT,UCOUNT,CNTRLO,CNTRHI)

SUBONE SEGMENT CODE
  RSEG SUBONE
```

USING 0

```
;********************
;********************
    ;OUTPUTS 6 SPACES TO THE MODEM
    ;DESTROYS R6,ACC.
    ;SUBS: MSEND
        ;************

SPACES: MOV R6,#6H         ;LOAD R6 WITH COUNT
SLOOP:  MOV A,#20H         ;LOAD ACC. WITH SPACE
        CALL MSEND         ;OUTPUT SPACE
        DJNZ R6,SLOOP      ;DECREMENT COUNT,AND REPEAT
        RET

;***************************
;***************************
    ;OUPUTS A LIST OF CHARACTERS FROM ROM TO INTERNAL UART
    ;DPTR CONTAINS STARTING ADDRESS OF CHARACTER LIST
    ;USES *0FFH* AS END OF BUFFER CHARACTER
    ;DESTROYS A,DPTR
    ;USES SUBROUTINES: MSEND
        ;********************

MOMOUT: MOV A,#0H          ;ACC=0
        MOVC A,@A+DPTR     ;LOAD BYTE FROM ROM
        CJNE A,#0FFH,MOUT  ;CHECK FOR END OF BUFFER
        RET                ;IF EOB THEN RETURN
MOUT:   CALL MSEND         ;OUTPUT CHARACTER
        INC DPTR           ;NEXT CHARACTER POINTER
        JMP MOMOUT         ;RETURN FOR NEXT CHARACTER

;******************
;******************
    ;LOADS CLOCK DATA INTO CLOCK RAM
    ;R0 CONTAINS ADDRESS OF DATA
    ;DPTR CONTAINS ADDRESS TO STORE DATA
    ;DATA IN R0 IS IN ASCII CODE
    ;DESTROYS ACC.,B,R0
    ;SUBS: WCRAM
        ;********

ANL A,#0FH         ;MASK OFF HIGH NIBBLE
        SWAP A             ;EXCHANGE NIBBLES OF ACC.
        XCH A,B            ;MOVE ACC. TO B
        INC R0             ;NEXT ASCII CHARACTER
        MOV A,@R0          ;LOAD ACC. WITH CHARACTER
        ANL A,#0FH         ;MASK OFF HIGH NIBBLE
        ORL A,B            ;OR BOTH NIBBLES TOGETHER
        INC R0             ;NEXT LOCATION
        INC R0             ;NEXT LOCATION
        CALL SETCLK        ;WRITE ACC. TO CLOCK RAM
        RET

;****************
;****************
    ;OUTPUTS NUMERICAL DATA FROM ROM
    ;DESTROYS ACC.,DPTR
        ;*******

SETOUT: CLR A              ;CLEAR ACC.
        MOVC A,@A+DPTR     ;LOAD ACC. WITH NUMERICAL CODE
        CALL BINHEX        ;OUTPUT NUMBERS
        RET

;*****************
```

```
;****************
;DIALS A NUMBER AND OUTPUTS A MESSAGE AND CALL CHANNEL DATA
;DESTROYS ACC.,R5,DPTR,*SCOUNT*,R0
;DESTROYS *MODE*,*DIAL*

;SUBS: HANGUP,WAIT,CLOOP,PULSET,MOMOUT,LFCR
    ;********;

DIALIN: CLR SCON.4           ;DISABLE RECIEVER
        MOV DPTR,#PHNUM      ;ADDRESS OF PHONE NUMBER
        CPL MODE             ;PUT MODEM IN ORIGINATE MODE
DIALNM: CLR A                ;CLEAR ACC.
        MOVC A,@A+DPTR       ;LOAD PHONE NUMBER DIGIT
        INC DPTR             ;NEXT DIGIT ADDRESS
        CJNE A,#0FFH,DIALCK  ;CHECK IF END OF NUMBER
        CPL MODE             ;ALLOWS 17 SEC. DISCONECT IF NO

;ANSWER CARRIER

WANSR:  MOV SCOUNT,#00H      ;CLEAR SCOUNT
        MOV HCOUNT,#00H      ;CLEAR HCOUNT
WANSR1: JNB CTS,CONECT       ;CHECK FOR CONNECT
        MOV A,SCOUNT         ;LOAD ACC. WITH SCOUNT
        CJNE A,#3CH,WANSR1   ;WAIT 60 SEC. FOR CONNECTION
        SETB NOANS           ;SET NO ANSWER FLAG
WANSR2: CALL HANGUP          ;HANGUP PHONE
        RET

DIALCK: CJNE A,#',',DIALD    ;CHECK FOR COMMA
DIALP:  MOV R5,#3H           ;LOAD COUNT INTO R5
        CALL WAIT            ;WAIT FOR 3 SECONDS
        JMP DIALNM           ;GET NEXT PHONE DIGIT

DIALD:  ANL A,#0FH           ;STRIP ASCII NIBBLE
        MOV R0,A             ;SAVE ACC. IN R0
DIALDC: CALL PULSET          ;OUTPUT PULSE
        DJNZ R0,DIALDC       ;REPEAT A PULSE FOR EACH NUMBER
        JMP DIALP            ;3 SECOND WAIT

SETB DUMP            ;SET DUMP TERMINAL BIT
        CALL HITDAT          ;OUTPUT TANK DATA TO MODEM
ENDUP:  CALL HANGUP          ;HANG UP PHONE
        SETB DIAL            ;INSURE AUTO-ANSWER MODE
        RET

;*********************
;*********************
;GENERATES A HIGH AND LOW PULSE FOR THE MODEM
;USES *DIAL*,*MSFLG*
;SUBS: MS40,MS60
    ;*************

PULSET: CPL DIAL             ;COMPLEMENTS DIAL BIT
        CALL MS40            ;40 MILLISECOND DELAY
D1:     JNB MSFLG,D1         ;WAITS FOR END OF DELAY
        CPL DIAL             ;COMPLEMENTS DIAL BIT
        CALL MS60            ;60 MILLISECOND DELAY
D2:     JNB MSFLG,D2         ;WAITS FOR END OF DELAY
        RET

;******************************
;******************************
;UART RECIEVER INTERRUPT ROUTINE FOR ANALOG BOARD UART
;INPUTS A ASCII CHARACTER FROM UART AND STORES IN *CHAR*
;SETS *RXFLG* TO INDICATE IT RECIEVED A CHARACTER
```

;DOES NOT DESTROY STATUS
;*********************

```
RXINT:  PUSH ACC              ;UART RECIEVER INTERRUPT
        PUSH PSW
        PUSH DPH
        PUSH DPL
        MOV DPTR,#8010H       ;UART ADDRESS
        MOVX A,@DPTR          ;INPUT CHARACTER
        MOV CHAR,A            ;SAVE CHARACTER
        SETB RXFLG            ;SET RECIEVE FLAG
        POP DPL
        POP DPH
        POP PSW
        POP ACC
        RETI
```

;****************************
;****************************
;OUTPUTS A CHARACTER FROM ACC. TO UART ON ANALOG BOARD
;OUTPUT CHARACTER MUST BE IN ACC.
;DESTROYS R6,R7
;********************

```
SO:     PUSH DPH
        PUSH DPL
        CLR IE.2              ;DISABLE RX INTERRUPT
        MOV DPTR,#8010H       ;UART ADDRESS
        MOVX @DPTR,A          ;OUTPUT CHARACTER
        MOV R7,#20H           ;TIME DELAY
KILL1:  MOV R6,#0FFH
KILL2:  DJNZ R6,KILL2
        DJNZ R7,KILL1
        SETB IE.2             ;ENABLE RX INTERRUPT
```

;****************************
;****************************
;ONE SECOND INTERRUPT ROUTINE
;CLEARS CLOCK INTERRUPT, SETS *CLKFLG*,
;INCREMENTS *SCOUNT*, AND PULSES WATCHDOG
;USES BIT P1.0 FOR CLOCK ENABLE AND WATCHDOG
;*********************

```
RTC:    PUSH DPL
        PUSH DPH
        PUSH ACC              ;SAVE STATUS
        PUSH PSW
        MOV DPTR,#200CH       ;CLOCK ADDRESS
        CLR P1.0              ;CLOCK ENABLE
        MOVX A,@DPTR          ;CLEAR CLOCK INTERRUPT
        SETB P1.0             ;DISABLE CLOCK
        INC UCOUNT            ;INCREMENT UPDATE TIME COUNT
        MOV A,UCOUNT          ;LOAD ACC. WITH UCOUNT DATA
        CJNE A,#3CH,NOMIN     ;COMPARE ACC. WITH 60 SECONDS
        MOV UCOUNT,#0H        ;CLEAR UCOUNT
        SETB MINFLG           ;SET MINUTE FLAG
        INC MCOUNT            ;INCREMENT MINUTE COUNT
        INC HCOUNT            ;INCREMENT HOUR COUNT
        JNB CNTFLG,NOMIN      ;CHECK FOR RATE COUNTER ENABLED
        CLR C                 ;CLEAR CARRY
        MOV A,#1H             ;LOAD ACC WITH ONE
        ADDC A,CNTRLO         ;ADD ONE TO CNTRLO
        MOV CNTRLO,A          ;SAVE BACK INTO CNTRLO
        JNC NOMIN             ;IF NO CARRY,SKIP NEXT STEP
        INC CNTRHI            ;IF CARRY, INCREMENT CNTRHI
NOMIN:  INC SCOUNT            ;INCREMENT SECONDS COUNTER
        POP PSW
```

```
        POP ACC              ;RESTORE STATUS
        POP DPH
        POP DPL
        RETI

;*********************
;*********************
    ;GENERATES A SHORT BEEP OUTPUT BEEP
    ;DESTROYS ACC.
    ;SUBS: SO
    ;************

RESPON: MOV A,#0F0H          ;SHORT BEEP CODE
        CALL SO              ;OUTPUT SHORT BEEP
        RET

;****************************
;****************************
    ;CONVERTS A BYTE TO A ASCII DIGIT AND OUTPUTS
    ;ACC. CONTAINS BINARY BYTE
    ;DESTROYS ACC.,B
    ;SUBS: MSEND
        ;************

BINHEX: PUSH DPH              ;SAVE DPH
        PUSH DPL              ;SAVE DPL
        MOV B,A               ;SAVE BINARY NUMBER
        SWAP A
        ORL A,#30H            ;GET FIRST ASCII NUMBER
        CALL MSEND            ;OUTPUT ASCII NUMBER
        MOV A,B               ;GET ORIGINAL BINARY NUMBER
        ANL A,#0FH            ;USE ONLY LOW NIBBLE
        ORL A,#30H            ;GET SECOND ASCII NUMBER
        CALL MSEND            ;OUTPUT NEXT ASCII NUMBER
        POP DPL               ;RESTORE DPL
        POP DPH               ;RESTORE DPH
        RET

;**********************
;**********************
    ;INPUTS DATA FROM R0 ADDRESS AND STORES IN DPTR ADDRESS
    ;R7 CONTAINS NUMBER OF LOCATIONS TO MOVE
    ;DESTROYS DPTR,R0,ACC.,R7
        ;************

MOVOUT: MOV A,@R0             ;LOAD DATA FROM R0 ADDRESS INTO ACC.
        MOVX @DPTR,A          ;SAVE DATA IN DPTR ADDRESS
        INC DPTR              ;NEXT DPTR ADDRESS
        INC R0                ;NEXT R0 ADDRESS
        DJNZ R7,MOVOUT        ;DECREMENT COUNTER, REPEAT IF NOT DONE
        RET

;
END
;DEBUG
;*********************************************************************
                ;TSUB2.A51 MAIN SUB-ROUTINES
                ;KKM 4/11/84
;*********************************************************************

PUBLIC DISPLY,EXIT,KYTEST,LITLED
    PUBLIC CLEAR,ACCESS,TANKL1,TANKL2,GETEMP,FORDAT
    PUBLIC SETPNT,TIMEHI,TIMELO,DCOLON,LEDOUT
```

```
EXTRN CODE(RESPON,SO,STPNTRS,GETPNT3,GETINT,SBINECD,DISGAL)
EXTRN CODE(HIPT1,DIALIN,WITTNK,TNKTST,TNKNO1,TNKNO2,PRES,TEMP)
EXTRN DATA(CHAR,SCOUNT,WCURW,DATE,HOUR,MIN,MCOUNT)
EXTRN BIT(RXFLG,ASCODE,KEYBAD,TNK1,TNK2,NOTANK)

SUBFIVE SEGMENT CODE
RSEG SUBFIVE

USING 0

;******************
;******************
;MASTER SUBROUTINE FOR DISPLAY

;*********

DISPLY: CALL RESPON          ;SEND OUT SHORT BEEP
        MOV A,CHAR           ;INPUT CHARACTER FROM UART
        CLR RXFLG            ;CLEAR RECIEVED DATA FLAG
        JB ASCODE,RITKEY     ;IF ACCESS CODE ALREADY ENTERED
        CJNE A,#0E9H,EXIT    ;IF INPUT NOT 9,EXIT
        MOV R0,#2H           ;NUMBER OF DIGITS IN ENTRY CODE
        CALL KYTEST          ;TEST INPUTS FOR ENTRY CODE
        JBC KEYBAD,EXIT      ;IF BAD INPUT, EXIT
        CALL ACCESS          ;LIGHT ACCESS LED
        RET                  ;RETURN TO MAIN PROGRAM
RITKEY: CLR C                ;CLEAR CARRY
        SUBB A,#0EAH         ;CHECK FOR FUNCTION KEYS
        JC NOGOOD            ;IF NOT FUNCTION KEY,RETURN
        MOV B,A              ;SAVE ACC.
        RL A                 ;MULTIPLY ACC. BY TWO
        RL A                 ;MULTIPLY ACC. BY TWO AGAIN
        MOV MCOUNT,#00H      ;CLEAR MINUTE COUNT
        MOV DPTR,#JMPTBL     ;LOAD DPTR WITH JUMP TABLE ADDRESS
        JMP @A+DPTR          ;JUMP TO CORRECT FUNCTION
EXIT:   CLR ASCODE           ;CLEAR ACCESS FLAG
        CLR TNK1             ;CLEAR TANK 1 FLAG
        CLR TNK2             ;CLEAR TANK 2 FLAG
        CALL CLEAR           ;CLEAR LCDS AND LEDS
NOGOOD: RET                  ;RETURN TO MAIN PROGRAM

JMPTBL: CALL DISGAL          ;CALL GALLONS OUTPUT
        RET
        CALL TEMP            ;CALL TEMPERATURE OUTPUT
        RET
        CALL TIMEHI          ;CALL DATE AND MONTH
        RET
        CALL TIMELO          ;CALL HOURS AND MINUTES
        RET
        CALL PRES            ;CALL PRESSURE AND WC. OUTPUT
        RET
        CALL SETPNT          ;CALL SETPOINT OUTPUT
        RET
        CALL TNKNO1          ;CALL TANK NO. 1 CODE
        RET
        CALL TNKNO2          ;CALL TANK NO. 2 CODE
        RET
        CALL DIALIN          ;DIAL HOME FOR TEST
        RET

;*********************
;*********************
;TESTS FOR CORRECT ACCESS CODE
;R0 CONTAINS NUMBER OF DIGITS IN CODE
```

```
;**********
KYTEST:MOV A,R0              ;LOAD ACC. WITH OFFSET
       MOV DPTR,#KYCODE       ;LOAD DPTR WITH ENTRY CODE ADDRESS
       MOVC A,@A+DPTR         ;LOAD ACC. WITH DIGIT OF CODE
       MOV B,A                ;SAVE CODE DIGIT
       MOV SCOUNT,#00H        ;LOAD SECONDS COUNTER WITH ZERO
CHKGIN:JBC RXFLG,KEYENT       ;JUMP IF RECIEVED DATA
       MOV A,SCOUNT           ;LOAD ACC. WITH SECONDS COUNT
       CJNE A,#10H,CHKGIN     ;WAIT ONLY 16 SECONDS FOR DIGIT
BDCODE:SETB KEYFLG            ;SET BAD ENTRY CODE FLAG
       RET                    ;RETURN
KEYENT:CALL RESPON            ;SEND OUT SHORT BEEP
       MOV A,CHAR             ;LOAD ACC. WITH RECIEVED DIGIT
       CJNE A,B,BDCODE        ;COMPARE INPUT WITH CODE DIGIT
       DJNZ R0,KYTEST         ;GET NEXT DIGIT OF CODE
       SETB ASCODE            ;ACCESS CODE FLAG
       RET

KYCODE:DB 0E4H,0E2H,0E7H

;*************
;*************
;LIGHTS CORRECT LED FOR FUNCTION

;********

LITLED:MOV A,B                ;LOAD ACC. WITH KEY CODE
       ORL A,#40H             ;OR WITH GREEN LED CODE
       CALL LEDOUT            ;CALL LED OUTPUT
       RET

;**************
;**************
;CLEARS ALL LEDS AND LCDS

;******

CLEAR:CLR A                   ;CLEAR ACC.
      CALL LEDOUT             ;CALL LED OUTPUT
      MOV A,#0F8H             ;WRITE TO BOTH LCD CODE
      CALL SO                 ;OUTPUT CODE
      CLR A                   ;CLEAR ACC.
      CALL SO                 ;OUTPUT CODE
      CLR A                   ;CLEAR ACC.
      CALL SO                 ;OUTPUT CODE
      MOV A,#02H              ;CLEAR LABEL CODE
      CALL SO                 ;OUTPUT CODE
      MOV A,#0F5H             ;COLONS CODE
      CALL SO                 ;OUTPUT CODE
      CLR A                   ;CLEAR ACC.
      CALL SO                 ;CLEAR ALL COLONS
      RET

;***************
;***************
;LIGHTS ACCESS LED

;*******

ACCESS:MOV A,#45H             ;ACCESS LED CODE
       CALL LEDOUT            ;CALL LED OUTPUT
       RET
```

```
;**************
;**************
;LIGHTS TANK 1 LED

;*******:

TANKL1:MOV A,#47H        ;TANK 1 LED CODE
       CALL LEDOUT        ;CALL LED OUTPUT
       RET

;**************
;**************
;LIGHTS TANK 2 LED

;********

TANKL2:MOV A,#48H        ;TANK 2 LED CODE
       CALL LEDOUT        ;CALL LED OUTPUT
       RET

;****************
;****************
;CALCULATES TEMPERATURE

;********

GETEMP:CALL STPNTRS      ;CALCULATES POINTERS
       MOV R0,#WCURW
       CALL GETPNT3
       CALL GETINT
       CALL SBINBCD       ;FP TO BCD CONVERSION
       RET

;****************
;****************
;FORMATS DATA TO OUTPUT TO LCDS
;HI BYTE LOADED IN B
;LOW BYTE LOADED IN R0
FORMAT:MOV A,R0           ;LOAD ACC. WITH LOW BYTE
       ANL A,#0F0H        ;MASK OFF LOW NIBBLE
       ORL A,B            ;OR HIGH BYTE AND NIBBLE
       SWAP A             ;SWAP NIBBLES
       MOV B,A            ;SAVE DATA IN B
       MOV A,R0           ;LOAD ACC. WITH LOW BYTE
       SWAP A             ;SWAP NIBBLES
       ANL A,#0F0H        ;MASK OFF HIGH NIBBLE
       MOV R0,A           ;STORE LOW BYTE IN R0
       RET

;****************
;****************
;OUTPUT SETPOINT TO LCDS

;********

SETPNT:CALL TNKTST        ;CHECK FOR TANK NUMBER
       JNB NOTANK,PNT1    ;IF NO TANK NUMBER,RETURN
       RET
PNT1:  CALL CLEAR         ;CLEAR LCDS AND LEDS
       CALL WITTNK        ;LIGHT CORRECT TANK LED
       CALL ACCESS        ;LIGHT ACCESS LED
       CALL LITLED        ;LIGHT FUNCTION LED
       CLR A              ;CLEAR ACC.
       MOV DPTR,#HIPT1    ;LOAD DPTR WITH ADDRESS OF HIPT1
```

```
SETOUT: MOVC A,@A+DPTR      ;LOAD ACC. WITH HIGH BYTE SETPOINT
        MOV  B,A            ;SAVE SETPOINT
        MOV  A,#1H          ;LOAD ACC. WITH ONE
        MOVC A,@A+DPTR      ;LOAD ACC. WITH LOW BYTE SETPOINT
        MOV  R0,A           ;SAVE LOW BYTE SETPOINT
        MOV  A,#0F6H        ;RIGHT LCD CODE
        CALL SO             ;OUTPUT CODE
        MOV  A,B            ;HIGH BYTE OF SETPOINT
        CALL SO             ;OUTPUT CODE
        MOV  A,R0           ;LOW BYTE OF SETPOINT
        ORL  A,#02H         ;SET. PT. LABEL CODE
        CALL SO             ;OUTPUT CODE
        RET

;*************
;*************
;OUTPUTS DATE AND MONTH TO LCDS

;*******

TIMEHI: CALL CLEAR          ;CLEAR LCDS AND LEDS
        CALL ACCESS         ;LIGHT ACCESS LED
        MOV  A,#83H         ;LED FUNCTION CODE
        CALL LEDOUT         ;LIGHT FUNCTION LED
        MOV  DPTR,#DATE     ;LOAD DPTR WITH DATE ADDRESS
        MOV  A,#0F7H        ;WRITE TO BOTH LCD CODE
        CALL SO             ;OUTPUT CODE
        CLR  P1.0           ;ENABLE CLOCK
        MOVX A,@DPTR        ;LOAD ACC. WITH DATE
        SETB P1.0           ;DISABLE CLOCK
        CALL SO             ;OUTPUT CODE
        INC  DPL            ;ADDRESS OF MONTH
        CLR  P1.0           ;ENABLE CLOCK
        MOVX A,@DPTR        ;LOAD ACC. WITH MONTH DATA
        SETB P1.0           ;DISABLE CLOCK

RET

;*****************
;*****************
;OUTPUTS HOURS AND MINUTES TO LCDS

;*********

TIMELO: CALL CLEAR          ;CLEAR LCDS AND LEDS
        CALL ACCESS         ;LIGHT ACCESS LED
        CALL LITLED         ;LIGHT FUNCTION LED
        MOV  DPTR,#HOUR     ;LOAD DPTR WITH HOUR ADDRESS
        MOV  A,#0F7H        ;WRITE BOTH LCD CODE
        CALL SO             ;OUTPUT CODE
        CLR  P1.0           ;ENABLE CLOCK
        MOVX A,@DPTR        ;LOAD ACC. WITH HOUR DATA
        SETB P1.0           ;DISABLE CLOCK
        CALL SO             ;OUTPUT HOUR DATA
        MOV  DPTR,#MIN      ;LOAD DPTR WITH MINUTES ADDRESS
        CLR  P1.0           ;ENABLE CLOCK
        MOVX A,@DPTR        ;LOAD ACC. WITH MINUTES DATA
        SETB P1.0           ;DISABLE CLOCK
        CALL SO             ;OUTPUT MINUTES DATA
        CALL DCOLON         ;LIGHT COLONS
        RET

;**************
;**************
;OUTPUTS COLONS TO LCDS
```

```
;*******
DCOLON:MOV A,#0F5H          ;WRITE TO COLON CODE
       CALL SO              ;OUTPUT CODE
       MOV A,#08H           ;LIGHT COLONS CODE
       CALL SO              ;OUTPUT CODE
       RET

;**************
;**************
;OUTPUTS CODE TO LEDS
;ACC. CONTAINS CODE TO BE SENT OUT
       ;********

LEDOUT:MOV R0,A             ;SAVE OUTPUT CODE
       MOV A,#0F4H          ;LEGHT LED CODE
       CALL SO              ;OUTPUT CODE
       MOV A,R0             ;LOAD ACC. WITH CODE
       CALL SO              ;OUTPUT CODE
       RET

;**********

;
END
$DEBUG
;******************************************************************
                     ;TSUB3.A51 MAIN SUB-ROUTINES
                     ;KRM 4/12/84
                     ;REPAIRED MDF 16APR84  REFINED FRSCHN
;******************************************************************

PUBLIC SCLOCK,GETANK,OUTNUM,ANALIN,SCAN
   PUBLIC RCRAM,RCLOCK,CBUSY,WCRAM,SETCLK,FRSCHN

EXTRN CODE(LFCR,MOMOUT,STPNTRS,BINHEX,MULF5,SBINBCD)
   EXTRN CODE(MULF4,SPACES,MSEND,GALL,INT,LDFAC,PSISPT)
   EXTRN DATA(CHNUM,BUFF1,SCOUNT,TANKNO,TCA)
   EXTRN BIT(DPRES,ADFLG,FACRNM,DIFBIT)

SUBTHREE SEGMENT CODE
   RSEG SUBTHREE

USING 0

;******************
;******************
;INPUTS PRESSURE AND DIFFERENTAL PRESSURE FROM ONE TANK
;ON A CONSECUTIVE PAIR OF TRANSDUCERS
;USES *CHNUM* AS LOCATION OF CHANNEL NUMBER
;SUBS: MOMOUT,MULF5,SBINBCD,OUTNUM,MULF4,LFCR,STPNTRS
       ;**********

GETANK:CALL MOMOUT          ;OUTPUT PREVIOUS MESSAGE
       CALL STPNTRS         ;DETERMINE POINTERS FOR CHANNEL
       CALL MULF5           ;PRESSURE READING
       CALL SBINBCD         ;FP TO BCD CONVERSION
       CALL OUTNUM          ;OUTPUT DATA
       CALL SPACES          ;OUTPUT SPACES
       INC CHNUM            ;NEXT CHANNEL NUMBER
       SETB DPRES           ;SET DIFFERENTIAL PRESSURE FLAG
       CALL STPNTRS         ;DETERMINE POINTERS FOR CHANNEL
       CALL MULF4           ;WATER COLUMN READING
       CALL SBINBCD         ;FP TO PACKED BCD CONVERSION
       CALL OUTNUM          ;OUTPUT DATA TO MODEM
```

```
        CALL SPACES          ;OUTPUT SPACES
        MOV A,TANKNO         ;LOAD ACC. WITH TANKNO DATA
        CJNE A,#0FFH,CALGAL  ;CHECK FOR GALLONS WANTED
        CALL LFCR            ;LINE FEED, CARRIAGE RETURN
        RET
CALGAL: CALL GALL            ;CALCULATE GALLONS
        CLR FACRNM;
        MOV DPTR,#TOA        ;GALLONS RESULT
        CALL LDFAC           ;LOAD FP ACC.
        CALL INT
        CALL SBINBCD         ;FP TO PACKED BCD CONVERSION
        MOV 1BH,1CH          ;MOVE 1C DATA TO 1B
        MOV 1CH,1DH          ;MOVE 1D DATA TO 1C
        MOV 1DH,#00H         ;CLEAR 1D DATA
        CALL OUTNUM          ;OUTPUT DATA TO MODEM
        CALL LFCR            ;LINE FEED, CARRIAGE RETURN
        RET

;***************
;***************
;DATA IS IN 1AH,1BH,1CH,1DH
;SUBS: MSEND,BINHEX
        ;********

OUTNUM: MOV A,1AH            ;LOAD ACC. WITH SIGN
        CALL MSEND           ;OUTPUT SIGN
        MOV A,1BH            ;LOAD ACC. WITH MSB DATA
        CALL BINHEX          ;CHANGE TO ASCII AND OUPUT
        MOV A,1CH            ;LOAD ACC. WITH NEXT MSB DATA
        CALL BINHEX          ;CHANGE TO ASCII AND OUTPUT
        JBC DPRES,WCOUT      ;CHECK IF DIFFERENTIAL PRESSURE
        JBC DIFBIT,DIFOUT    ;CHECK FOR DIFFERENCE OUTPUT
        MOV A,#'.'           ;LOAD ACC. WITH DECIMAL POINT
        CALL MSEND           ;OUTPUT DECIMAL POINT
DIFOUT: MOV A,1DH            ;LOAD ACC. WITH LSB DATA
        CALL BINHEX          ;CHANGE TO ASCII AND OUTPUT
        RET

WCOUT:  MOV A,1DH            ;LOAD ACC. WITH LSB
        ANL A,#0F0H          ;MASK OFF HIGH NIBBLE
        SWAP A               ;SWAP NIBBLES
        ORL A,#30H           ;CHANGE TO ASCII FORMAT
        CALL MSEND           ;SEND OUT ASCII
        MOV A,#'.'           ;LOAD ACC. WITH DECIMAL POINT
        CALL MSEND           ;SEND OUT DECIMAL POINT
        MOV A,1DH            ;LOAD ACC. WITH LSB
        ANL A,#0FH           ;MASK OFF LOW NIBBLE
        ORL A,#30H           ;CHANGE TO ASCII FORMAT
        CALL MSEND           ;OUTPUT ASCII
        RET

;***************
;***************
;OUTPUTS CLOCK DATA
;DESTROYS ACC.
;SUBS: RCLOCK,BINHEX,MSEND
        ;********

SCLOCK: CALL RCLOCK          ;CHECK IF CLOCK IS UPDATING
        CALL BINHEX          ;CHANGE TO ASCII AND OUPUT CLOCK
        MOV A,#'/'           ;LOAD ACC. WITH SLASH
        CALL MSEND           ;OUTPUT SLASH
        RET

;**********************
```

```
;************************
;INPUTING AN ANALOG INPUT FROM THE ANALOG BOARD
;ACC. CONTAINS THE CHANNEL NUMBER
;*BUFF1* IS THE BASE ADDRESS OF THE INTERNAL RAM BUFFER
;P1.3 IS THE BIT TO START AND STOP CONVERSION
;P1.4 IS THE STATUS BIT TO CHECK FOR END OF CONVERSION
;DESTROYS ACC.,DPTR,R0
        ;**************

ANALIN: MOV  DPTR,#8030H    ;MUX ADDRESS
        MOVX @DPTR,A        ;SET THE CHANNEL NUMBER
        SETB P1.3           ;START CONVERSION
        RL   A              ;CALCULATE OFFSET
        MOV  R0,#BUFF1      ;LOAD ANALOG BASE ADDRESS
        ADD  A,R0           ;ADD OFFSET
        MOV  R0,A           ;OFFSET ADDRESS

CJNE A,#..,ALCHN    ;CHECK IF SCOUNT IS #0
        SETB ADFLG          ;SET A/D FLAG
        RET
VALCHN: JB   P1.4,VALID1    ;WAIT FOR FIRST CONVERSION
VALID1: JNB  P1.4,VALID1    ;WAIT FOR SECOND CONVERSION
VALID2: JB   P1.4,VALID2    ;WAIT FOR FINISHED CONVERSION
        CLR  P1.3           ;STOP CONVERSION
        MOVX A,@DPTR        ;INPUT HIGH BYTE
        MOV  @R0,A          ;STORE DATA IN ARRAY
        INC  DPL            ;LOW BYTE ADDRESS
        INC  R0             ;NEXT ARRAY LOCATION
        MOVX A,@DPTR        ;INPUT LOW BYTE
        MOV  @R0,A          ;STORE DATA IN ARRAY
        RET

;*****************************
;*****************************
;SCAN ROUTINE   INPUTS A LOW CHANNEL, AND A SPECIFIED NUMBER
;OF CHANNELS ABOVE THE STARTING CHANNEL
;R0 CONTAINS STARTING LOW CHANNEL
;R1 CONTAINS NUMBER OF CHANNELS TO INPUT
;DESTROYS ACC.,R1
;SUBS: ANALIN
        ;*****************

SCAN:   MOV  A,R0           ;INPUT STARTING CHANNEL NUMBER
        CALL ANALIN         ;INPUT CHANNEL DATA
        INC  R0             ;NEXT CHANNEL NUMBER
        DJNZ R1,SCAN        ;REPEAT FOR R1 NUMBER OF CHANNELS
        RET

;*****************************
;*****************************
;READING CLOCK RAM
;DPTR CONTAINS ADDRESS TO READ
;RETURNS WITH DATA IN ACC.
;USES P1.0 TO ENABLE CLOCK
;DESTROYS ACC.
        ;*****************

RCRAM:  CLR  P1.0           ;ENABLE CLOCK
        MOVX A,@DPTR        ;READ CLOCK RAM
        SETB P1.0           ;DISABLE CLOCK
        RET

;*****************************
;*****************************
;READ THE CLOCK
```

```
;DPTR CONTAINS ADDRESS TO READ
;ACC. RETURNS THE DATA
;SUB: CBUSY,RCRAM
     ;********

RCLOCK:CALL CBUSY          ;VERIFY NO UIP
       CALL RCRAM          ;READ CLOCK RAM
       RET

;*******************
;*******************
;CHECK IF CLOCK IS IN UPDATE
;    
;DESTROYS ACC.
     ;***********

CBUSY: PUSH DPL            ;SAVE DATA POINTER
       MOV DPL,#0AH        ;LOAD STATUS REGISTER
CWAIT: CLR P1.0            ;ENABLE CLOCK
       MOVX A,@DPTR        ;INPUT STATUS
       SETB P1.0           ;DISABLE CLOCK
       JB ACC.7,CWAIT      ;WAIT FOR UIP
       POP DPL             ;RESTORE CLOCK REGISTER
       RET

;*********************
;*********************
;WRITING INTO CLOCK RAM
;DPTR CONTAINS ADDRESS TO WRITE INTO
;ACC. CONTAINS DATA TO BE WRITTEN
;USES P1.0 TO ENABLE CLOCK
     ;*************

WCRAM: CLR P1.0            ;ENABLE CLOCK
       MOVX @DPTR,A        ;WRITE CLOCK RAM
       SETB P1.0           ;DISABLE CLOCK
       RET

;*******************
;*******************
;SET THE CLOCK
;DPTR CONTAINS ADDRESS TO BE WRITTEN TO
;ACC. CONTAINS DATA TO WRITE INTO THE CLOCK
;P1.0 ENABLES CLOCK
;SUB: CBUSY
     ;************

SETCLK:PUSH ACC            ;SAVE DATA
       CALL CBUSY          ;CHECK FOR UIP
       POP ACC             ;RESTORE DATA
       CALL WCRAM          ;WRITE TO CLOCK RAM
       RET

;***************
;COMPARES PRESURE WITH 75 PSIG
;USES CARRY TO SET LOW PRESSURE FLAGS
     ;*********

PRSCHK:CALL STPNTRS        ;DETERMINE POINTERS FOR CHANNEL
       CALL MULF5
       CALL SBINBCD        ;FP TO BCD CONVERSION
       CLR C               ;CLEAR CARRY
       MOV DPTR,#PSISPT
```

```
        CLR A
        MOVC A,@A+DPTR
        MOV B,A            ;STORE HIBCD SETPT
        MOV A,1BH          ;LOAD ACC. WITH HIBCD PRES
        SUBB A,B           ;PRES HIBCD-SETPT HIBCD
        JC BALOUT          ;SETPT>PRES CARRY=1 *ALARM*
        JNZ BALOUT         ;PRES>SETPT CARRY=0
        INC DPTR
        CLR A
        ....
        ....
        SUBB A,B           ;SUBTRACT LOBCD SETPT
BALOUT: RET                ;RETURN WITH CARRY=0 OLT

;******
;
END
$DEBUG
;***********************************************************************
;               ;TSUB4.AS1   MAIN SUB-ROUTINES
;                      ;KKM  4/12/84
;***********************************************************************

PUBLIC MSECX,HANGUP,MSECX,WAIT,MXINT,CHKTNK,RATCAL
    PUBLIC MSEND,PICKUP,MS100,LFCR,MI,MS60,MS40,OUTTIM,LODTIM

EXTRN CODE(BINHEX,MOMOUT,MES13,OUTNUM,FLOAT,STFAC,FPMUL,FPDIV)
    EXTRN CODE(SBINBCD,FACTR9,DIFF,MESS,MES14,MES15,MES16)
    EXTRN CODE(MOVOUT,RCLOCK,LDFAC,INT)
    EXTRN BIT(DTR,CTS,MODFLG,MSFLG,BTANK1,FACRAM,LIFBIT)
    EXTRN BIT(OUTFLG,TIMOUT,TANK1,TANK2,LOPRS1,DPRES,CALBIT)
    EXTRN DATA(MOCHAR,SCOUNT,BUFF1,BUFF2,TS,CNTRHI,CNTRLO)
    EXTRN DATA(HOUR,MIN,DATE,MONTH,SAVTIM)

SUBFOUR SEGMENT CODE
    RSEG SUBFOUR

USING 0

;****************
;****************
;MILLISECOND TIME DELAY INTERRUPT ROUTINE
;USES TIMER 0 IN 8031
        ;**********

MSECX:  PUSH PSW
        CLR TR0            ;STOP T0
        CLR ET0            ;DISABLE T0 INTERRUPT
        SETB MSFLG         ;SET MILLISECOND FLAG
        POP PSW
        RETI

;*****************
;*****************
;WAITS A SPECIFIED NUMBER OF SECONDS
;LOCATION 05H CONTAINS THE NUMBER OF SECONDS TO WAIT
;USES *SCOUNT* AS SECONDS COUNTER
;DESTROYS 07,SCOUNT,ACC.
        ;**********

WAIT:   MOV SCOUNT,#00H    ;START ACOUNT AT ZERO
FLOP:   MOV A,SCOUNT       ;LOAD ACC. WITH SCOUNT
```

```
        CJNE A,05H,FLOP     ;COMPARE SCOUNT WITH 07 LOCATION
        RET

;****************
;****************
;CLEARS INTERNAL SERIAL BUFFER
;*MODCHAR* IS ADDRESS OF SERIAL DATA
;CLEARS *MODFLG*
;*MODFLG* IS RECIEVED INTERNAL DATA FLAG
;DESTROYS ACC.,MODCHAR,MODFLG
;********

CLR MODFLG          ;CLEAR RECIEVED INTERNAL FLAG
        RET

;**************
;**************
;HANGS UP THE PHONE
;CLEARS *DTR*
;WAITS FOR *CTS* TO GO HIGH
;DESTROYS SCOUNT,R5
;SUBS: WAIT
;********

HANGUP: MOV DPTR,#MES20      ;EOT CHARACTER
        CALL MOMOUT          ;OUTPUT CHARACTER
        SETB DTR             ;SETS DTR
        SETB CALBIT          ;SET CALLED-BIT
        MOV R5,#04H          ;LOADS R7 WITH FOUR
        CALL WAIT            ;WAITS FOUR SECONDS
        CLR DTR              ;CLEARS DTR
ITSELF: JNB CTS,ITSELF       ;WAITS FOR CTS TO GO HIGH
        SETB SCON.4          ;ENABLE RECIEVER
        RET

MES20:  DB 'BYE',0DH,0AH,0FFH

;********************
;********************
;WAITS 100 MILLISECONDS THEN OUTPUTS A CHARACTER
;*OUTFLG* IS INTERNAL TRANSMITT FLAG
;*MSFLG* IS INTERNAL TIMER FLAG
;DESTROYS ACC.,SBUF,OUTFLG
;SUBS: MS100,HANGUP
;************

MSEND:  CALL MS100           ;WAIT FOR 100 MILLISECONDS
MTLOOP: JBC OUTFLG,SLAB00    ;IF INTERNAL TRANSMITT FLAG
        JBC MSFLG,SLAB01     ;IF INTERNAL TIMER 0 FLAG
        JMP MTLOOP           ;REPEAT LOOP
SLAB00: MOV SBUF,A           ;LOAD SBUFF WITH ACC.
        RET
SLAB01: CALL HANGUP          ;HANGUP
        RET

;******************
;******************
;ANSWERS THE PHONE
;SENDS OUT A PROMPT
;INPUTS CHARACTERS FORM MODEM
;DESTROYS R5,ACC.,R0,BUFF1
;USES *BUFF1* AS TEMPORARY BUFFER FOR INCOMING DATA
;CAN ONLY ACCEPT 15 CHARACTERS PLUS CARRIAGE RETURN OR LINE FEED
;SUBS: WAIT,MI,MSEND
;**********
```

```
PICKUP: CALL WAIT              ;WAIT
        CALL MI                ;CLEAR OUT TRANSMITT BUFFER
        MOV A,#')'             ;COMMAND PROMPT
        CALL MSEND             ;OUTPUT PROMPT
        JB CTS,OVER            ;IF CTS SET THEN END
        MOV R0,#BUFF1          ;LOAD R0 WITH BUFF2 ADDRESS
FLING:  MOV SCOUNT,#00H        ;CLEAR SCOUNT
INNING: JB MODFLG,GOOM         ;IF RECIEVED CHARACTER, CONTINUE
        SETB TIMOUT            ;SET TIMOUT SET IF NO INPUT
        JMP OVER               ;JUMP TO OVER
GOOM:   CALL MI                ;INPUT RECIEVED CHARACTER
        MOV @R0,A              ;STORE RECIEVED CHARACTER
        INC R0                 ;NEXT LOCATION
        CJNE R0,#BUFF2,CON2    ;CHECK FOR 17TH CHARACTER
        SETB TIMOUT            ;SET TIMEOUT FLAG
        JMP OVER               ;JUMP TO OVER
CON2:   CJNE A,#0DH,CON3       ;IF CARRIAGE RETURN, END
OVER:   RET
CON3:   CJNE A,#0AH,FLING      ;CHECK FOR LINE FEED
        RET

;******************
;******************
;MILLISECOND DELAY ROUTINE
;USES INTERNAL TIMER 0
;MS100 IS 100 MILLISECOND DELAY
;MS60 IS 60 MILLISECOND DELAY
;MS40 IS 40 MILLISECOND DELAY
;*MSFLG* IS INTERNAL TIMER INTERUPT FLAG
        ;*********

MS100:  CLR TR0                ;STOP T0
        MOV TH0,#7DH           ;LOAD TIMER 0 3@6MHZ 7D@4.19MHZ
        MOV TL0,#0CAH          ;LOAD TIMER 0 B0@6MHZ CA@4.19MHZ
        JMP COM                ;JUMP TO COMPLETE
MS60:   CLR TR0                ;STOP T0
        MOV TH0,#0C5H          ;LOAD TIMER 0 8A@6MHZ B1@4.19MHZ
        MOV TL0,#0DAH          ;LOAD TIMER 0 C8@6MHZ DA@4.19MHZ
        JMP COM                ;JUMP TO COMPLETE
MS40:   CLR TR0                ;STOP T0
        MOV TH0,#0CBH          ;LOAD TIMER 0 B1@6MHZ CB@4.19MHZ
        MOV TL0,#0E5H          ;LOAD TIMER 0 D8@6MHZ E5@4.19MHZ
COM:    CLR MSFLG              ;CLEAR INTERRRUPT FLAG
        SETB TR0               ;START T0
        SETB ET0               ;ENABLE INTERRUPT
        RET

;***************
;***************
;GENERATES A LINE FEED AND CARIAGE RETURN FOR THE MODEM
;DESTROYS ACC.
;SUBS: MSEND
        ;********

LFCR:   MOV A,#0DH             ;CARRIAGE RETURN
        CALL MSEND             ;OUTPUT TO MODEM
        MOV A,#0AH             ;LINE FEED
        CALL MSEND             ;OUTPUT TO MODEM
        RET

;************
;************
;MODEM INTERUPT ROUTINE

;*****
```

```
MXINT:  PUSH PSW              ;SAVE STATUS
        PUSH ACC              ;SAVE ACC.
        JNB RI,OUTINT         ;CHECK FOR RECIEVE INTERUPT
        CLR RI                ;CLEAR RECIEVE
        SETB RCFLG            ;SET RECIEVE FLAG
OUTINT: JNB TI,SLOGO          ;TEST TRANSMIT FLAG
        CLR TI                ;CLEAR TRANSMIT BIT
        SETB OUTFLG           ;SET OUT FLAG
SLOGO:  POP ACC               ;RESTOR ACC.
        POP PSW               ;RESTORE STATUS
        RETI

;*************
;CHECKS WHICH TANKS ARE BELOW CHECKPOINT
;*****

CHKTNK:  JNB LOPRS1,LVCHK1    ;IF NO LOW PRESSURE FLAG,CHECK WC
         MOV DPTR,#MES16      ;LOAD DPTR WITH MESSAGE 13 ADDRESS
         CALL MOMOUT          ;OUTPUT MESSAGE
         CALL LFCR            ;OUTPUT LINE FEED,CARRIAGE RETURN
LVCHK1:  JNB TANK1,TK2        ;CHECK IF TANK1 LOW
         JNB BTANK1,WARN1     ;IF NO BOTTOM TANK FLAG,CHECK LEVEL
         MOV DPTR,#MES14      ;LOAD DPTR WITH MESSAGE 14 ADDRESS
         CALL MOMOUT          ;OUTPUT MESSAGE
         MOV DPTR,#MES13      ;LOAD DPTR WITH MESSAGE 13 ADDRESS
         CALL MOMOUT          ;OUTPUT MESSAGE
         CALL OUTTIM          ;OUTPUT SETPOINT TIME
         CALL LFCR            ;OUTPUT LINE FEED,CARRIAGE RETURN
         CALL RATCAL          ;CALL RATE CALCULATION
         SETB DIFLT           ;SET DIFFERENCE OUTPUT BIT
         CALL OUTNM           ;OUTPUT RATE OF DROP
         MOV DPTR,#MES15      ;LOAD DPTR WITH MESSAGE 15 ADDRESS
         CALL MOMOUT          ;OUTPUT MESSAGE
         JMP TK2              ;CHECK SECOND TANK
WARN1:   MOV DPTR,#MES5       ;LOAD DPTR WITH MESSAGE 5 ADDRESS
         CALL MOMOUT          ;OUPUT MESSAGE
         MOV DPTR,#MES13      ;LOAD DPTR WITH MESSAGE 13 ADDRESS
         CALL MOMOUT          ;OUTPUT MESSAGE
         CALL OUTTIM          ;OUTPUT SETPOINT TIME
TK2:     RET

;*******************************
;CALCUALTES RATE FLOW BETWEEN SETPOINTS
;*CNTRLO* IS LOW BYTE OF RATE TIME COUNTER
;*CNTRHI* IS HIGH BYTE OF RATE TIME COUNTER
;RATE TIME COUNTER IS MEASURED IN MINUTES
;*DIFF* IS THE DIFFERENCE BETWEEN SETPOINTS
;*FACTR9* IS CONSTANT OF 60
;SUBS: FLOAT,FPMUL,FPDIV,SBINBCD,STFAC
;******************

RATCAL:  MOV A,CNTRLO         ;LOAD ACC. WITH LOW BYTE OF COUNTER
         MOV B,CNTRHI         ;LOAD B WITH HIGH BYTE OF COUNTER
         CALL FLOAT           ;CONVERT TO FLOATING POINT
         MOV DPTR,#T5         ;LOAD DPTR WITH TEMPERARY ADDRESS
         CLR FACRNM           ;CLEAR FACRNM BIT FOR RAM LOCATION
         CALL STFAC           ;SAVE FP TIME COUNT IN CNVTMP
         MOV DPTR,#DIFF       ;LOAD DPTR WITH DIFFERENCE ADDRESS
         CLR A                ;CLEAR ACC.
         MOVC A,@A+DPTR       ;LOAD HIGH BYTE OF DIFFERENCE
         MOV B,A              ;STORE HIGH BYTE IN B
         MOV A,#1H            ;LOAD ACC WITH ONE
         MOVC A,@A+DPTR       ;LOAD LOW BYTE OF DIFFERENCE
         CALL FLOAT           ;CHANGE TO FP NOTATION
         MOV DPTR,#FACTR9     ;LOAD DPTR WITH FACTR9 ADDRESS
```

```
           MOV DPTR,#TO              ;LOAD DPTR WITH COUNTER ADDRESS
           CLR FACRNM                ;RAM LOCATION
           CALL FPDIV                ;DIVIDE DIFFERENCE IN TIME
           CALL INT                  ;FP TO INTEGER CONVERSION
           CALL SBINBCD              ;CONVERT TO PACKED BCD
           RET

;*****************************
;       SAVES THE TIME AND DATE INTO EXTERNAL MEMORY
;       *SAVTIM* IS LABEL OF TIME ARRAY IN EXTERNAL MEMORY
;       DESTROYS 1A,1B,1C,1D,DPTR,ACC.,R0
;       SUBS: RCLOCK,MOVOUT
;******************

LODTIM: MOV DPTR,#MONTH              ;LOAD DPTR WITH MONTH ADDRESS
        CALL RCLOCK                  ;READ CLOCK
        MOV R0,#1AH                  ;LOAD R0 WITH 1A FOR ADRESS
        MOV @R0,A                    ;SAVE MONTH DATA IN 1AH
        MOV DPTR,#DATE               ;LOAD DPTR WITH DATE ADDRESS
        INC R0                       ;INCREMENT R0
        CALL RCLOCK                  ;READ CLOCK DATA
        MOV @R0,A                    ;SAVE DATE DATA IN 1BH
        MOV DPTR,#HOUR               ;LOAD DPTR WITH HOUR ADDRESS
        INC R0                       ;INCREMENT R0
        CALL RCLOCK                  ;READ CLOCK DATA
        MOV @R0,A                    ;SAVE HOUR DATA IN 1CH
        MOV DPTR,#MIN                ;LOAD DPTR WITH MINUTE ADDRESS
        INC R0                       ;INCREMENT R0
        CALL RCLOCK                  ;READ CLOCK DATA
        MOV @R0,A                    ;SAVE MINUTE DATA IN 1D
        MOV DPTR,#SAVTIM             ;LOAD DPTR WITH SAVTIM ADDRESS
        MOV R0,#1AH                  ;LOAD R0 WITH 1AH ADDRESS
        MOV R7,#4H                   ;LOAD R7 WITH NUMBER OF BYTES
        CALL MOVOUT                  ;STORE CLOCK DATA IN SAVTIM ADDRESS
        RET

;******************************
;       OUTPUTS THE DATE AND TIME TO MODEM
;       *SAVTIM* IS LOCATION OF CLOCK DATA
;       DESTROYS DPTR,ACC
;       SUBS: BINHEX,MSEND,LFCR
;******************

OUTTIM: MOV DPTR,#SAVTIM             ;LOAD DPTR WITH SAVTIM ADDRESS
        MOVX A,@DPTR                 ;LOAD ACC WITH MONTH DATA
        CALL BINHEX                  ;CHANGE TO ASCII AND OUTPUT
        MOV A,#'/'                   ;LOAD ACC WITH ASCII /
        CALL MSEND                   ;OUTPUT /
        INC DPL                      ;INCREMENT DPTR
        MOVX A,@DPTR                 ;LOAD ACC WITH DATE DATA
        CALL BINHEX                  ;CHANGE TO ASCII AND OUTPUT
        MOV A,#' '                   ;LOAD ACC WITH ASCII 'SPACE'
        CALL MSEND                   ;OUPUT SPACE
        MOV A,#' '                   ;LOAD ACC. WITH ASCII 'SPACE'
        CALL MSEND                   ;OUTPUT SPACE
        INC DPL                      ;INCREMENT DPTR
        MOVX A,@DPTR                 ;LOAD ACC WITH HOUR DATA
        CALL BINHEX                  ;CHANGE TO ASCII AND OUTPUT
        MOV A,#':'                   ;LOAD ACC WITH :
        CALL MSEND                   ;OUTPUT :
        INC DPL                      ;INCREMENT DPTR
        MOVX A,@DPTR                 ;LOAD ACC WITH MINUTES
        CALL BINHEX                  ;CHANGE TO ASCII AND OUTPUT
```

```
;********************************************
;SUPPORT ROUTINES FOR  LBERT LIN LEVEL FLOATING   INT MATH
;
$INCLUDE(:F2:TFPDCL.PUB)
;
EXTRN CODE(FPMUL,STFAC,FPADD,LDFAC,FPRDIV,FPCMP,INT,FLOAT,FDATA);FP MATH
EXTRN CODE(RTC,MSECX,RXINT,MXINT,INI)   ;INT. AND INITIALIZATION
;
;FACTR2                  0C34H;CONVERT PRESSURE TO LBS.
BLKBASE         EQU     0900H;BASE OF A/D BLOCK;
;FACTR1                  0030H;CONVERT TO INCHES OF WATER
;INCRM                   0038H;FLOATING POINT # OF 1.0
NRCNV           EQU     0032H;ADDRESS OF POINTER FOR CONV. VALUE
NRW             EQU     0030H;ADDRESS OF POINTER FOR RAW INTEGER
TOTBL1          EQU     0003H;DISTANCE TO LOOKUP TABLE
WCURW           EQU     0034H;ADDRESS OF POINTER FOR WEIGHTING
WCLTAV          EQU     0036H;ADDRESS OF POINTER FOR CURRENT AVG.
TMPFP1          EQU     0920H;TEMPORARY FLOATING POINT # ADDRESS
POINTB          EQU     002FH;STACK LOCATION BEFORE POINTER PUSHES
;MAXW                    003CH;MAXIMUM VALUE OF WEIGHTING FACTOR
;FACTR3                  0040H;THERMOCOUPLE CONVERSION FACTOR
;FACTR4                  ;CONVERSION FOR OUTPUT X 100
;FACTR5                  ;CONVERSION FOR OUTPUT X 10
;
;
;GET POINTER FOR EXTERNAL ARRAY
CSEG
;
;       START OF PROGRAM CODE SEGMENT
;
ORG 00H;
        JMP PDWN;       JUMP TO POWER DOWN HANDLER
;
ORG 03H;                INT0
        JMP RTC;
ORG 0BH;                TIMER 0
        JMP MSECX;
ORG 13H;                INT1
        JMP RXINT;
ORG 1BH;                TIMER 1
        JMP 00H;
ORG 23H;                UART
        JMP MXINT;
ORG 30H;                CONSTANTS
;
FACTR1:         DB 0C5H,020H,0CFH,03DH;         .101136719 INCHES W.C./COUNT
FACTR2:         DB 000H,000H,096H,03DH;         .073242190 PSI/COUNT
INCRM:          DB 000H,000H,080H,03FH;         1.00000000 VALUE FOR INCREME
MAXW:           DB 000H,000H,000H,041H;         8.00000000 VAL. OF MAX. WEIG
FACTR3:         DB 0FDH,0FFH,0F9H,03DH;         .1220703 VOLTS/COUNT
FACTR4:         DB 000H,000H,020H,041H;         10.0000000 SCALER FOR WC OUT
FACTR5:         DB 000H,000H,0C8H,042H;         100.000000 SCALER FOR PSI OU
FACTR6:         DB 000H,000H,0C8H,042H;         100.000000 SCALER FOR THERMO
FACTR7:         DB 066H,066H,0E6H,03FH;         1.80000000 9/5 FOR CENT. TO
FACTR8:         DB 000H,000H,000H,042H;         32.0000000 FOR CENT/FAR.
FACTR9:         DB 000H,000H,070H,042H;         60.0000000 FOR MINUTES/HOUR

ORG 100H
;
$INCLUDE(:F2:TGALL.A51)
;
;               POWER UP PRECONDITIONER
;
        CLR A;                  CLEAR PORTS
        MOV P0,A;
        MOV P2,A;
        INC A;                  MAKE SURE CLOCK IS DISABLED
        MOV P1,A;
```

```
                MOV  SP,#060H;           INITIALIZE STACK POINTER
    PDN0:       MOV  R7,#04H;            WAIT TO BE SURE ITS NOT TEMPORARY
    PDN1:       MOV  R6,#0FFH;
    PDN2:       MOV  R5,#0FFH;
    PDN3:       DJNZ R5,PDN3;
                DJNZ R6,PDN2;
                DJNZ R7,PDN1;
                MOV  DPTR,#0200EH;       INCREMENT THE POWER UP COUNTER
                CLR  P1.0;               OPEN CLOCK
                MOVX A,@DPTR;            GET COUNT
                INC  A;                  INCREMENT
                CJNE A,#00H,NOTFULL;     IF ZERO IT OVERFLOWED
                DEC  A;                  RETURN TO MAXIMUM
    NOTFULL:    MOVX @DPTR,A;            REPLACE
                SETB P1.0;               LOCK CLOCK
                JMP  INI;                INITIALIZE SYSTEM
    ;
    ;
    ;       START OF FLOATING POINT MATH SUPPORT
    ;***********************************************
    ;
    ;       SIGNED BINARY TO BCD CONVERSION
    ;
    ;Takes a signed binary integer with the most significant byte in the B reg
    ;and converts it to packed bcd in locations 1BH,1CH,1DH with the most
    ;significant digit in the lowest address. Location 1AH holds the ASCII
    ;code for a minus sign if negative or a space if positive. Performs a
    ;bank switch to bank 3 and uses all registers of that bank. Positive overf
    ;causes a wrap-around to a negative number, while negative overflow genera
    ;the unique combination of -0
    ;
    ;USES A,B,23H AND ALL REGISTERS OF BANK 3;INTERRUPTS SHOULD PUSH PSW AND B
    ;SWITCH TO BANK 0, RESTORING PSW UPON RETURN
    ;
    ;***********************************************
    ;
    SBINBCD: SETB PSW.3;                 BANK SWITCH TO 3
             SETB PSW.4;
             PUSH ACC;                   SAVE LSBY
             CLR  A;                     INITIALIZE REGISTERS
             MOV  R0,A;
             MOV  R1,A;
             MOV  R2,A;
             MOV  R3,A;
             MOV  R4,A;
             MOV  R5,A;
             MOV  27H,A;
             POP  ACC;                   RECOVER LSBY
             MOV  R7,#010H;              INITIALIZE LOOP COUNTER
             XCH  A,B;                   START WITH MSBY
             MOV  C,ACC.7;               SAVE SIGN IN DELTA
             MOV  DELTA,C;
             JNC  STRLP;                 IF CARRY COMPLEMENT A:B
             XCH  A,B;
             CPL  A;
             ADDC A,#00H;
             XCH  A,B;
             CPL  A;
             ADDC A,#00H;
             CJNE R7,#07H,NOEX;          TIME TO SWAP TO LSBY?
             XCH  A,B;
    NOEX:    CLR  C;                     CLEAR OLD FLAG
             RLC  A;                     GET NEW FLAG
             PUSH ACC;                   SAVE FLAGS
             JNC  OVERS1;                IF NO FLAG DON'T BOTHER
             MOV  A,#03H;                SETUP FOR TABLE
             ADD  A,R7;                  ADD LOOP COUNT TO INDEX
             MOVC A,@A+PC;
             JMP  OVET;
```

```
;
;
DB  00H,03H,06H,09H,0CH,0FH,12H,15H,18H,1BH,1EH,21H,24H,27H,2AH,2DH;
;
OVET:    CALL BCDER;                    ADD INTEGERS
OVERS1:  POP ACC;                       RESTORE FLAGS
         CJNE R7,#00H,STRLP;            DONE?
PTBL1:   JNB DELTA,MINUSS;              DECIDE IF PLUS OR MINUS
         MOV A,#02DH;                   MINUS ASCII
         JMP BYE;
MINUSS:  MOV A,#020H;                   SPACE ASCII
BYE:     MOV R2,A;                      PLACE IN FRONT OF # THEN BANK SWITCH TO 0
         CLR PSW.3;
         CLR PSW.4;
         RET;
;
;
BCDER:   MOV R6,#03H;                   INITIALIZE # OF BYTES TO TRANSFER
         ADD A,#TOTBL1;                 SETUP INDEX FOR TABLE
BLP:     MOV 27H,A;                     SAVE INDEX FOR NEXT TIME
         MOVC A,@A+PC;                  GET BYTES FROM TABLE
         JMP FFFAR;
;
;
DB    001H,000H,000H;       2!0         1T
DB    002H,000H,000H;       2!1         2T
DB    004H,000H,000H;       2!2         4T
DB    008H,000H,000H;       2!3         8T
DB    016H,000H,000H;       2!4        16T
DB    032H,000H,000H;       2!5        32T
DB    064H,000H,000H;       2!6        64T
DB    028H,001H,000H;       2!7       128T
DB    056H,002H,000H;       2!8       256T
DB    012H,005H,000H;       2!9       512T
DB    024H,010H,000H;       2!10     1024T
DB    048H,020H,000H;       2!11     2048T
DB    096H,040H,000H;       2!12     4096T
DB    092H,081H,000H;       2!13     8192T
DB    084H,063H,001H;       2!14    16384T
;
;
FFFAR:   PUSH ACC;                      PUSH BYTE ONTO STACK
         MOV A,27H;                     RESTORE INDEX
         INC A;                         NEXT BYTE
         DJNZ R6,BLP;                   DECREMENT LOOP
         POP ACC;                       MSBY INTO R0
         MOV R0,A;
         POP ACC;                       NSBY INTO R1
         MOV R1,A;
         POP ACC;                       LSBY INTO R2
         MOV R2,A;
         CLR C;                         R5+R2 THEN DAA INTO R5
         MOV A,R5;
         ADDC A,R2;
         MOV R5,A;
         MOV A,R4;                      R4+R1+CARRY THEN DAA INTO R4
         ADDC A,R1;
NOCORR:  DA A;
         MOV R4,A;
         MOV A,R3;                      R3+R0+CARRY THEN DAA INTO R3
         ADDC A,R0;
         DA A;
         MOV R3,A;
         RET;
```

;
;
;***********************************************
;
;
;                THERMOCOUPLE ROUTINE
;
;The thermocouple routine obtains the raw integer value from the array
;as specified by the channel # in 'CHNUM', converts it to a floating point
;number, multiplies it by a conversion factor, then stores the value under
;the label of 'NRCNV' for that channel in the data array. The number is
;then multiplied by 10T in order to scale it properly for conversion to
;an integer. The integer value is then stored in the data array under label
;'WCURW' as signed binary with it's least significant byte first
;
;USES A,B,R0,DPTR,FAC AND ROUTINES GETPNT3,GETPNT2,PNTIN,FPMUL,FLOAT:INT,GE
;
;***********************************************
;
;
THERMO: MOV R0,#NRW;              GET POINTER FOR RAW INTEGER
        CALL GETPNT3;
        CALL GETINT;              IN RAM
        CALL FLOAT;               LOAD FAC
        MOV DPTR,#FACTR3;         GET POINTER FOR CONVERSION FACTOR
        SETB FACRNM;              IN ROM
        CALL FPMUL;               MULTIPLY
        CALL CENTFAR;             CONVERT TO FARENHEIGHT
        MOV R0,#NRCNV;            PLACE IN CONVERTED VALUE
        CALL GETPNT3;
        CLR FACRNM;               RAM
        CALL STFAC;               STORE FAC
        MOV DPTR,#FACTR6;         GET SCALAR FOR FP TO INT CONVERSION
        SETB FACRNM;              IN ROM
        CALL FPMUL;               MULTIPLY
        CLR FACRNM;               IN RAM
        MOV R0,#WCURW;            STORE IN CURRENT WEIGHTING
        CALL GETPNT3;
        CALL STFAC;
        CALL INT;                 CONVERT TO INTEGER
        MOVX @DPTR,A;             PLACE LSBY FIRST @DPTR
        INC DPTR;
        XCH A,B;                  SWAPPED AGAIN
        MOVX @DPTR,A;
        XCH A,B;                  LAST SWAP
        RET;
;
;
;***********************************************
;
;       CENTIGRADE TO FARENHEIGHT CONVERSION
;
;CENTFAR converts the floating point number in the fac (assumed to be
;degrees centigrade) into degrees farenheight by first multiplying by
;
;USES DPTR AND ROUTINES FPMUL,FPADD
;
;*****************    ****************  
;
CENTFAR:MOV DPTR,#FACTR7;
        SETB FACRNM;
        CALL FPMUL;
        MOV DPTR,#FACTR8;
        SETB FACRNM;
        CALL FPADD;
        RET;
;

;**********************************************
;
;       COMPLEMENTING ROUTINE FOR FP NUMBERS
;
;Routine checks to make sure that the floating point number to be complemer
;is not zero, which would generate a negative overflow. If zero then the
;number is left unchanged.
;
;USES A,B,DPTR AND ROUTINES FDATA
;
;**********************************************
;
;
FABS:   MOV A,16;
        ORL A,1BH;
        ORL A,1CH;
        ORL A,1DH;
        JZ NONONO;              IF ZERO DO NOT COMPLEMENT
        CPL FACSGN;
NONONO: RET;
;
;
;**********************************************
;
;
;       GET POINTER FOR RAM ARRAY
;
;GETPNT uses the channel number specified by 'CHNUM' to look up the base
;of the channel in the data array. It returns the address in a temporary
;pointer space 'TPL','TPH'
;
;USES A,CHNUM,TPL,TPH AND NO ROUTINES
;
;**********************************************
;
;
GETPNT: PUSH ACC;               SAVE LSBY OF FP #
        MOV A,CHNUM;            GET CH#
        ADD A,#TOTBL1;          SET UP INDEX INTO TABLE
        MOVC A,@A+PC;           GET LSBY OF ADDRESS
        JMP OVER1;              JMP OVER TABLE
DB 20H,30H,40H,50H,60H,70H,80H,90H;
;
OVER1:  MOV TPL,A;              PLACE BYTE IN TEMP. POINTER LOW
OVER2:  MOV TPH,#08H;           MOVE TO TEMP. POINTER HIGH
        POP ACC;                RESTORE LSBY OF FP #
        RET;
;
;
;**********************************************
;
;       GET POINTER IN CLOCK RAM
;then places it in the temporary pointer locations 'TPL','TPH'
;
;USES A,TPL,TPH AND N ROUTINES
;
;**********************************************
.;
;
CRMPNT: PUSH ACC;               SAVE LSBY OF FP #
        MOV A,CHNUM;            GET CH #
        ADD A,#TOTBL1;          SET UP INDEX INTO TABLE
        MOVC A,@A+PC;           GET LSBY OF POINTER
        JMP OVER3;              JMP OVER TABLE
DB 10H,18H,20H,28H,30H,38H,48H,48H;
OVER3:  MOV TPL,A;              MOVE TO TEMP. POINTER LOW
OVER4:  MOV TPH,#20H;           MOVE TO TEMP. POINTER HIGH
        POP ACC;                RESTORE LSBY OF FP #
        RET;

;
;
;*****************************************************
;
;       MOVE POINTER FROM TPL,TPH INTO DPTR
;
;PNTIN moves the pointer located in 'TPL','TPH' into the data pointer.
;
;USES TPL,TPH,DPTR AND NO ROUTINES
;
;*****************************************************
;
PNTIN:  MOV DPL,TPL;               MOVE TEMP. POINTER TO DPTR
        MOV DPH,TPH;
        RET;
;
;
;*****************************************************
;
;MOVE WORDS
;
;MOVWRDS moves the group of integer data values located at 900H in external
;and moves them into their respective places in the data array. All eight
;are moved. The most significant and least significant parts are reversed.
;
;USES A,B,R7,CHNUM,TPL,TPH,DPTR AND ROUTINES GETPNT
;
;*****************************************************
;
MOVWRDS:MOV R7,#08H;                R7 HOLDS # OF CHANNELS TO MOVE
BASPNT: MOV DPTR,#BLKBASE;           DPTR POINTS TO BASE OF BLOCK
        DEC R7;
        MOV A,R7;                    STARTING WITH CH#8
        RL A;                        MULTIPLY BY 2 FOR TWO BYTES
        ADD A,DPL;                   INDEX DPTR
        JNC NOCARE;                  SEE IF CARRY FROM INDEX
        INC DPH;                     IF SO, INCREMENT DPH
NOCARE: MOV DPL,A;                   RETURN DPL
        MOVX A,@DPTR;                GET MSBY OF A/D RESULT FROM BLOCK
        MOV C,ACC.5;
        ANL A,#0FH;
        JC NOINVER;
        CPL A;
NOINVER:PUSH ACC;                    SAVE ON STACK
        INC DPTR;                    POINT TO LSBY
        MOVX A,@DPTR;                GET LSBY
        ADD A,#01H;
        JNC OKJOE;
        POP B;
        INC B;
        PUSH B;
OKJOE:  PUSH ACC;                    SAVE ON STACK
        MOV CHNUM,R7;                SET FOR CURRENT CHANNEL
        CALL GETPNT;                 GET POINTER
        MOV DPL,TPL;                 MOV TO DPTR
        MOV DPH,TPH;
        POP ACC;                     REVERSE ORDER OF BYTES DURING MOVE
        MOVX @DPTR,A;                MOV @POINTER
        POP ACC;
        INC DPTR;                    U SPLEEEM
        MOVX @DPTR,A;
        MOV A,R7;
        JNZ BASPNT;
        RET;
;
;

;*********************************************
;
;SET UP POINTERS FOR A CHANNEL
;
;STPNTRS uses the channel number in CHNUM to set up the pointers in interna
;for that channel in the data array. Interrupts are disabled, the stack poi
;contents are moved to 7EH, the stack pointer is then used to push the
;the addresses of the values for the channel into addresses 30H to 38H. The
;stack pointer contents are then restored and interrupts enabled
;
;USES A,R7,SP,DPTR,IE,7EH AND ROUTINES GETPNT,PNTIN
;
;*********************************************
;
;
```
STPNTRS:PUSH ACC;               SAVE LSBY OF FP #
        CALL GETPNT;            GET POINTER FOR CH #
        CALL PNTIN;             MOVE POINTER TO DPTR
        CLR IE.7;               DISABLE INTERUPTS
        MOV 7EH,SP;             STORE STACK POINTER @ ADDR. 7EH
        MOV SP,#POINTB;         SET SP FOR BASE OF POINTER AREA
        MOV R7,#04H;            SET UP FOR NUMBER OF POINTERS
LPZ:    PUSH DPL;               PUSH POINTER INTO POINTER AREA
        PUSH DPH;
        INC DPTR;               SET UP FOR NEXT POINTER
        INC DPTR;
        INC DPTR;
        INC DPTR;
        DJNZ R7,LPZ;            SEE IF DONE
        MOV SP,7EH;             RESTORE STACK POINTER
        SETB IE.7;                      ENABLE INTERRUPTS
        NOP;
        POP ACC;                RESTORE LSBY OF FP #
        RET;
```
;
;*********************************************
;
;
; GET A POINTER BASED @R0;
;
;GETPNT2 uses the number in R0 as an index into the the array of data
;pointers for a channel i.e. mov R0,#NRCNV & call GETPNT2. The pointer
;is placed in TPL,TPH.
;
;USES A,R0,TPL,TPH AND NO ROUTINES
;
;*********************************************
;
```
GETPNT2:PUSH ACC;               SAVE LSBY OF FP #
        MOV A,@R0;              GET LSBY OF POINTER
        MOV TPL,A;              MOVE TO TEMP. POINTER LOW
        INC R0;                 NEXT BYTE
        MOV A,@R0;              MOVE TO ACC
        MOV TPH,A;              MOVE TO TEMP. POINTER HIGH
        DEC R0;                 RESTORE INDEX
        POP ACC;                RESTORE LSBY OF FP #
        RET;
```
;
;
;*********************************************;
;
;
;   GET A POINTER & PUT IN DPTR;
;
;GETPNT3 combines the operations of GETPNT2 and PNTIN to retrieve and place
;the pointer for a desired variable into the data pointer
;
;USES ROUTINES GETPNT2,PNTIN
;
;*********************************************

```
;
;
GETPNT3:CALL GETPNT2;           GET POINTER FROM TABLE
        CALL PNTIN;             PUT INTO DPTR
        RET;
;
;
;*******************************************
;
;
;   GET AN INTEGER WORD & PLACE IN A:B
;
;GETINT gets the two byte integer pointed to by the data pointer and
;places it in the B:A registers and reverses the order of the bytes.
;
;USES A,B,DPTR AND ROUTINES PNTIN
;
;*******************************************
;
;
GETINT: CALL PNTIN;             MOVE TEMP. POINTER INTO DPTR
GETINT1:MOVX A,@DPTR;           GET FIRST BYTE
        MOV B,A;                MOVE INTO B
        INC DPTR;               INCREMENT POINTER
        MOVX A,@DPTR;           MOVE TO ACC.
        XCH A,B;                SWAP BYTES
        RET;
;
;
;***************************************************
;
;       MOVE # TO MAXIMUM LOCATION IN CLOCK RAM
;
;N2MAX moves the current floating point converted to integer for a channel
;into clock ram followed by the present time (hours,min) into the next
;consecutive locations.
;
;USES R0 AND ROUTINES GETPNT3,LDFAC,INT,CRMPNT,PNTIN,OUTBYTE,TIMEMOV
;
;***************************************************
N2MAX:  MOV R0,#NRCNV;          GET ADDRESS OF POINTER FOR CONV. VALUE
        CALL GETPNT3;           GET POINTER
        CALL LDFAC;             LOAD FP ACC
        CALL INT;               CONVERT TO INTEGER
        CALL CRMPNT;            LOOK UP POINTER FOR CLOCK RAM
        CALL PNTIN;             PLACE ADDRESS IN DPTR
        CLR P1.0;               ENABLE CLOCK CHIP SELECT
        CALL OUTBYTE;           SEND BYTE TO CLOCK RAM
        CALL TIMEMOV;           MOVE TIME TO 'TIME OF MAXIMUM'
        SETB P1.0;              DISABLE CLOCK CHIP SELECT
        RET;
;
;
;***************************************************
;
;       MOVE # TO MINUMUM LOCATION IN CLOCK RAM
;
;N2MIN moves the current floating point value converted to an integer
;into the location in clock ram specified by the channel number followed
;by the current time (hours,mins).
;
;USES R0,DPTR AND ROUTINES GETPNT3,LDFAC,INT,CRMPNT,PNTIN,OUTBYTE,TIMEMOV
;
;***************************************************
;
N2MIN:  MOV R0,#NRCNV;          GET ADDRESS OF POINTER FOR CONV. VALUE
        CALL GETPNT3;           GET POINTER FOR VALUE & PLACE IN DPTR
        CALL LDFAC;             LOAD NUMBER INTO FP ACC.
```

```
        CALL INT;               CONVERT TO INTEGER
        CALL CRMPNT;            GET POINTER FOR ADDRESS IN CLOCK RAM
        CALL PNTIN;             PLACE ADDRESS IN DPTR
        INC DPTR;               INDEX TO MINIMUM
        INC DPTR;
        INC DPTR;
        INC DPTR;
        CLR P1.0;               ENABLE CLOCK CHIP SELECT
        CALL OUTBYTE;           SEND BYTE TO CLOCK RAM
        CALL TIMEMOV;           MOVE TIME TO 'TIME OF MINIMUM'
        SETB P1.0;              DISABLE CLOCK CHIP SELECT
        RET;
;
;
;**********************************************************
;
;STORBTH sets the maximum and minimum recorded values in clock ram to the
;value.
;
;USES ROUTINES N2MAX,N2MIN
;
STORBTH:CALL N2MIN;             MAX AND MIN SET TO THE SAME VALUE
        CALL N2MAX;
        RET;
;
;
;**********************************************************
;
;       MOVE B:A @DPTR SAVEING B:A DPTR=DPTR+2
;
;OUTBYTE moves the contents of the B:A register into the locations pointed
;to by the data pointer preserving the contents of B:A and leaving the
;data pointer twice incremented
;
;USES A,B,DPTR AND NO ROUTINES
;
;**********************************************************
OUTBYTE:XCH A,B;
        MOVX @DPTR,A;
        INC DPTR;
        XCH A,B;
        MOVX @DPTR,A;
        XCH A,B;
        INC DPTR;
        RET;
;
;
;**********************************************************
;
;       MOVE TIME TO LOCATION 2 BYTES ABOVE DPTR
;
;TIMEMOV moves the time to the clock ram address two bytes above the
;current address pointed to by the data pointer.
;
;USES TPL,TPH,DPTR,A AND ROUTINES PNTIN
;
;**********************************************************
;
TIMEMOV:MOV TPH,DPH;
        MOV TPL,DPL;
        MOV DPTR,#02002H;
        MOVX A,@DPTR;
        PUSH ACC;
        INC DPTR;
        INC DPTR;
        MOVX A,@DPTR;
        CALL PNTIN;
        MOVX @DPTR,A;
```

```
          INC DPTR;
          POP ACC;
          MOVX @DPTR,A;
          RET;
;
;
;***********************************
;
;       INITIALIZE FOR COLD START
;
;FRSTME stores the long term water column average in clock ram in the data
;array for a specified channel
;
;USES R0 AND ROUTINES CRMPNT,PNTIN,LDFAC,GETPNT3,STFAC
;
;***********************************
;
;
FRSTME: CALL CRMPNT;             GET CRAM ADDRESS
        CLR FACRNM;              SET FLAG FOR DATA IN RAM
        CALL PNTIN;              PLACE POINTER IN DPTR
        CLR P1.0;                ENABLE CLOCK CHIP SELECT
        CALL LDFAC;              LOAD FLOATING POINT ACCUMULATOR
        SETB P1.0;               DISABLE CLOCK CHIP SELECT
        MOV R0,#WCLTAV;          GET ADDRESS OF POINTER FOR WCLTAV
        CALL GETPNT3;            PLACE POINTER IN DPTR
        CALL STFAC;              STORE FLOATING POINT ACCUMULATOR
        RET;                     BYE
;
;
;***************************************************
;
;       EXPONENT TEST FOR W.C.
;last time it was tested if not it will use the difference between the
;new and old value as a weighting factor (the larger the difference, the
;more heavily the old reading will be weighted.  ce the exponents have
;remained equal for two readings the weighting will reduce to 8/1.
;if the exponents do not equate themselves after the number of readings
;specified by WCNTLIM, the weighting for one reading will reduce to 8/1
;in an effort to correct the average for the rapid value change.
;
;USES A,WCNTLIM,LSTEXP,WCNTR AND ROUTINES LDFAC
;
;***************************************************
;
TSTR1:  MOV A,FACEXP-1;
        PUSH ACC;
        CJNE A,LSTEXP,NQUITE;
YOUSHW: MOV DPTR,#MAXW;
        SETB FACRNM;
        CALL LDFAC;
        CLR FACRNM;
        CLR A;
        MOV WCNTR,A;
CUR2LST:POP ACC;
        MOV LSTEXP,A;
        RET;
NQUITE: INC WCNTR;
        MOV A,WCNTR;
        CJNE A,WCNTLIM,CUR2LST;
        JMP YOUSHW;

;
;***************************************************
;
;MULF4 multiplies the WCLTAV for a given channel by factor #4
;and then converts it to an integer in the B:A registers
```

```
;USES R0,DPTR,A,B AND ROUTINES GETPNT3,LDFAC,FPMUL,INT
;
;**********************************************************
;
MULF4:   MOV  R0,#WCLTAV;
         CALL GETPNT3;
         CLR  FACRNM;
         CALL LDFAC;
         MOV  DPTR,#INWC;
         CALL STFAC;
         MOV  DPTR,#FACTR4;
         SETB FACRNM;
         CALL FPMUL;
         CALL INT;
         RET;
;
;
;**********************************************************
;
;MULF5 multiplies the new floating point converted value by factor #5
;then converts it to an integer in the B:A registers
;
;USES R0,A,B,DPTR AND ROUTINES GETPNT3,LDFAC,FPMUL,INT
;
;**********************************************************
;
MULF5:   MOV  R0,#NRCNV;
         CALL GETPNT3;
         CLR  FACRNM;
         CALL LDFAC;
         CALL STFAC;
         MOV  DPTR,#FACTR5
         SETB FACRNM;
         CALL FPMUL;
         CALL INT;
         RET;
;
;
;*******************************************************
;
;
;WEIGHTED MOVING AVERAGE OF WATER COLUMN
;
;
WCRUTE:  CALL STPNTRS;          SET UP POINTERS @30H
         CALL FRSTME;           MOVE CLOCK WCLTAV TO RAM
         PUSH ACC;              SAVE THE ACC.
         MOV  R0,#NRW;          GET THE POINTER ADDRESS FOR RAW INTEGER
         CALL GETPNT3;          GET POINTER AND MOVE TO DPTR
         CALL GETINT;           MOVE THE INTEGER INTO B:A
         CALL FLOAT;            CONVERT TO FLOATING POINT
         SETB FACRNM;           SET UP FOR ROM DATA
         MOV  DPTR,#FACTR1;     MULTIPLY BY CONVERSION FACTOR
         CALL FPMUL;
         MOV  R0,#NRCNV;        SET R0 FOR ADDRESS OF CONVERTED VALUE
         CALL GETPNT3;          GET POINTER AND STORE FAC @DPTR
         CLR  FACRNM;
         CALL STFAC;
         CALL FABS;             COMPLEMENT SIGN OF FAC(SUBTRACT)
         MOV  R0,#WCLTAV;       GET ADDRESS OF POINTER FOR LT AVERAGE
         CALL GETPNT3;          GET POINTER & MOVE INTO DPTR
         CLR  FACRNM;
         CALL FPADD;            SUBTRACT CURRENT FROM LONG TERM AVERAGE
         MOV  C,FACSGN;         SAVE RESULTANT SIGN IN DELTA(1=POS. CHNG.)
         MOV  DELTA,C;
         CLR  FACSGN;           ABS VALUE IN FAC
         CALL TSTR1;
```

```
           MOV R0,#WCURW;          GET ADDRESS OF POINTER FOR CURRENT WEIGHTING
           CALL GETPNT3;           GET POINTER & PLACE INTO DPTR
           CLR FACRNM;
           CALL STFAC;             STORE FAC IN CURRENT WEIGHTING FACTOR
           MOV DPTR,#INWC;
           CALL STFAC;
           MOV R0,#WCLTAV;         GET ADDRESS OF POINTER FOR LT AVERAGE
           CALL GETPNT3;           GET POINTER & PLACE IN DPTR
           CLR FACRNM;
           CALL FPMUL;             MULTIPLY LT AVERAGE BY WEIGHTING
           MOV R0,#NRCNV;          GET ADDRESS OF POINTER FOR REAL CONV.VAL.
           CALL GETPNT3;           GET POINTER & PLACE IN DPTR
           CLR FACSGN;             MAKE FAC INTO ABSOLUTE VALUE
           CLR FACRNM;
           CALL FPADD;             ADD THE NEW READING
           MOV DPTR,#TMPFP1;       SAVE RESULT IN TEMPORARY FP #1
           CLR FACRNM;
           CALL STFAC;
           MOV R0,#WCURW;          GET ADDRESS OF POINTER FOR CURRENT WEIGHTING
           CALL GETPNT3;           GET POINTER & PLACE IN DPTR
           CLR FACRNM;
           CALL LDFAC;             LOAD FAC
           SETB FACRNM;            SET BIT TO MARK DATA IN ROM
           MOV DPTR,#INCRM;        PUT ADDRESS OF REAL # 1.0 INTO DPTR
           CALL FPADD;             ADD 1.0 TO VALUE OF CURRENT WEIGHTING
           SETB FACRNM;            SET FLAG FOR DATA IN ROM
           CALL FPRDIV;            DIVIDE 1.0 BY CONTENTS OF FAC
           CLR FACRNM;
           CALL FPMUL;             MULTIPLY BY FAC
           MOV R0,#WCLTAV;         PLACE RESULT IN CURRENT LT AVERAGE
           CALL GETPNT3
           CLR FACRNM;
           CALL STFAC;
           CALL CRMPNT;            GET CLOCK RAM POINTER
           CALL PNTIN;             MOV POINTER TO DPTR
           CLR P1.0;               ENABLE CLOCK CHIP SELECT
           CLR FACRNM;
           CALL STFAC;             STORE IN CLOCK
           SETB P1.0;              DISABLE CLOCK CHIP SELECT
           POP ACC;                RESTORE ACC
           RET;
;
;
;********************************************************
;
;
PRESS:     CALL STPNTRS;           SET UP POINTERS FOR CHANNEL
           MOV R0,#NRW;            GET ADDRESS OF POINTER FOR RAW INTEGER
           CALL GETPNT3;           GET POINTER & PLACE INTO DPTR
           CALL GETINT1;           PLACE INTEGER INTO B:A
           CALL FLOAT;             CONVERT TO FLOATING POINT
           MOV DPTR,#FACTR2;       MULTIPLY BY CONV. FACTOR #2
           SETB FACRNM;            SET FLAG FOR DATA IN ROM
           CALL FPMUL;             MULTIPLY
           MOV R0,#NRCNV;          GET ADDRESS OF POINTER FOR CONVERTED VAL
           CALL GETPNT3;           GET POINTER & PLACE INTO DPTR
           CLR FACRNM;             SET FLAG FOR DATA IN RAM
           CALL STFAC;             STORE FAC IN CONVERTED VALUE
           JB BRNDNEW, STIRBTH;    SEE IF FIRST RUN ON POWER-UP
           JMP NOWAY;
STIRBTH:   JMP STORBTH;
NOWAY:     CALL CRMPNT;            GET CLOCK RAM POINTER FOR CH
           CLR P1.0;               ENABLE CLOCK CHIP SELECT
           CALL GETINT;            MOVE INTEGER INTO B:A
           SETB P1.0;              DISABLE CLOCK CHIP SELECT
           XCH A,B;
           CALL FLOAT;             CONVERT TO FLOATING POINT
           MOV R0,#NRCNV;          GET ADDRESS OF POINTER FOR NEW REAL VAL.
```

```
            CALL GETPNT3;          GET POINTER & PLACE IN DPTR
            CLR FACRNM;
            CALL FPCMP;            COMPARE WITH CURRENT MAXIMUM
            ANL A,#07FH;           MASK OFF 'NO COMPARISON'
            JZ EQUALD;             IF EQUAL THEN FORGET THIS
            JB ACC.6,EN2MAX;       IF GREATER THAN CURRENT STORE IN MAX.
            CALL CRMPNT;           GET CRAM POINTER
            CALL PNTIN;            PLACE POINTER IN DPTR
            INC DPTR;              INDEX TO MINIMUM VALUE
            INC DPTR;
            INC DPTR;
            INC DPTR;
            CLR P1.0;              ENABLE CLOCK
            CALL GETINT1;          MOVE INTEGER TO B:A
            SETB P1.0;             DISABLE CLOCK
            XCH A,B;
            CALL FLOAT;            CONVERT B:A TO FLOATING POINT
            MOV R0,#NRCNV;         GET ADDRESS OF POINTER FOR NRCNV
            CALL GETPNT3;          MOVE POINTER TO DPTR
            CLR FACRNM;            SET FLAG FOR DATA IN RAM
            CALL FPCMP;            COMPARE
            ANL A,#07FH;           MASK OFF NO COMPARISON IN RESULT
            JZ EQUALD;             IF ## EQUAL GET LOST
            JNB ACC.6,EN2MIN;      IF LESS THAN CURRENT STORE IN MINIMUM
            RET;                   BYE-BYE
EN2MIN:     JMP RENTRY             MOVE NEW VALUE TO MINIMUM IN CLOCK
EQUALD:     RET;                   BYE-BYE
;
;***********************************************;
;
;
END;
            PUBLIC  FACSGN,FACBTM,FACRNM,NANFLG,OVFFLG,UNFFLG
            PUBLIC  FACT, FACEXP,FACMAN,EXPVLA,TS,S TIM
            PUBLIC  CNVTMP,GALL,CNTFLG,FACTR9,CNTRHI,CNTRLO,BTANK1
            PUBLIC  FNCTM1,FNCTM2,FNCTM3,XSRTMP,TCALL1,DIFBIT
            PUBLIC  FACBIT,BRNDNEW,TOA,CNTRLO,CNTRHI,MONTH
            PUBLIC  CHKFLG,RXFLG,ASCODE,KEYBAD,TNK1,TNK2,NOTANK,CTS,CALBIT
            PUBLIC  TIMOUT,IEASET,TANK1,TANK2,MINFLG,DTR,MODFLG,MSFLG,OUTFLG
            PUBLIC  MODE,DIAL,DUMB,ANABAS,SEC,MIN,HOUR,DATE,CHAR,SCOUNT
            PUBLIC  BUFF1,BUFF2,MCOUNT,TRYCNT,MOCHAR,HCOUNT,NOANS
            PUBLIC  SBINBCD,THERMO,GETPNT3,MOVWRDS,STPNTRS,GETINT,MULF4,GETINT1
            PUBLIC  MULF5,WCRUTE,PRESS,DPRES,ADFLG,UCOUNT,LOPRES,LOPRS1,LOPRS2
            PUBLIC  CHNUM,WCURW,CRMPNT,RESETS,NRCNV,RAMLY,TANKNO
;
FACSGN      BIT     20H.7       ; Sign of value in FAC
FACBTM      BIT     20H.6       ; Bit temporary
FACRNM      BIT     20H.5       ; Flag to signal ROM resident constant
NANFLG      BIT     20H.4       ; Not-A-Number Result Flag
OVFFLG      BIT     20H.3       ; Overflow (Infinite) Result Flag
UNFFLG      BIT     20H.2       ; Underflow Result Flag
FACBIT      DATA    20H         ;
DELTA       BIT     22H.0       ; DIRECTION OF CHANGE
BRNDNEW     BIT     22H.1       ; FLAG FOR FIRST RUN AFTER POWER-UP
CHKFLG      BIT     23H.0       ; TIMER INT. FLAG
RXFLG       BIT     23H.1       ; RCV INT. FLAG
ASCODE      BIT     23H.2       ; ACCESS FLAG
KEYBAD      BIT     23H.3       ; BAD KEY
TNK1        BIT     23H.4       ; TANK 1
TNK2        BIT     23H.5       ; TANK 2
NOTANK      BIT     23H.6       ; NO TANK KEY
CALBIT      BIT     23H.7       ; CALLED BIT
TIMOUT      BIT     24H.0       ; TIME OUT BIT
IEASET      BIT     24H.1       ; IEAS CODE SECURITY PASS AUTHORIZATION INSPECTOR
TANK1       BIT     24H.2       ; TANK 1 LOW FLAG
TANK2       BIT     24H.3       ; TANK 2 LOW FLAG
MINFLG      BIT     24H.4       ; MINUTE FLAG
MODFLG      BIT     24H.5       ; INTERNAL UART INTERRUPT FLAG
```

```
MSFLG   BIT   24H.6   ; INTERNAL TIMER 0 FLAG
OUTFLG  BIT   24H.7   ; INTERNAL UART TX FLAG
DUMB    BIT   25H.0   ; DUMB TERMINAL BIT
RAMLY   BIT   25H.1   ; ROUTINE FLAG NXPNTR
CTS     BIT   P1.6    ;
DTR     BIT   P1.2    ;
MODE    BIT   P1.7    ;
DIAL    BIT   P1.1    ;
DPRES   BIT   25H.2   ;DIFFERENTIAL PRESSURE FLAG
ADFLG   BIT   25H.3   ;A/D ERROR FLAG
NOANS   BIT   25H.4   ;NO ANSWER FLAG
LOPRES  BIT   25H.5   ;LOW PRESSURE FLAG
LOPRS1  BIT   25H.6   ;LOW PRESSURE ONE FLAG
LOPRS2  BIT   25H.7   ;LOW PRESSURE TWO FLAG
BTANK1  BIT   26H.0   ;BOTTOME TANK 1 FLAG
TCALL1  BIT   26H.1   ;TANK 1 CALL FLAG
CNTFLG  BIT   26H.2   ;RATE COUNTER FLAG
DIFBIT  BIT   26H.3   ;DIFFERENCE OUTPUT FLAG
;
;***   FACBIT bits 1:0 hold error code (0, 1, 2, 3)   ***
;
;
;
FACTMP  DATA  15H
;
FHCMAN  DATA  1DH
;
EXPVLA  DATA  1EH
;
TPL     DATA  038H;
;
TPH     DATA  039H;
;
LSTEXP  DATA  03AH;
;
WCNTR   DATA  03BH;
;
CHNUM   DATA  03CH;
;
CHAR    DATA  040H;
;
SCOUNT  DATA  041H;
;
MCOUNT  DATA  042H;
;
TRYCNT  DATA  043H;
;
MOCHAR  DATA  044H;
;
TANKNO  DATA  045H;
;
HCOUNT  DATA  046H;
;
UCOUNT  DATA  047H;
;
CNTRLO  DATA  048H;
;
CNTRHI  DATA  049H;
;
BUFF1   DATA  050H;
;
BUFF2   DATA  060H;
;
; **********  EXTERNAL MEMORY DECLARATIONS
;
```

```
CNVTMF  XDATA  800H    ; Floating point temp for conversion routines
;
FNCTM1  XDATA  804H;
;
FNCTM2  XDATA  808H;
;
FNCTM3  XDATA  80CH;
;
ANABAS  EQU  900H;
;
SEC     EQU  2000H;
;
MIN     EQU  2002H;
;
HOUR    EQU  2004H;
;
DATE    EQU  2007H;
;
MONTH   EQU  2008H;
;

XSRTMF  EQU    CNVTMF      ; Temporary for polynomial evaluation
; *
FBIAS   EQU    127
ERUNF   EQU    1           ;FPERR UNDERFLOW ERROR CODE
EROVF   EQU    2           ;FPERR OVERFLOW ERROR CODE
ERNAN   EQU    3           ;FPERR INVALID OPERATION ERROR CODE
UCNTLIM EQU    02H         ;NUMBER OF MINUTES TO SETTLE
```

15/920 20/890 25/952 30/934 35/928 40/948 45/278

We claim:

1. A method for measuring the level of substance in a tank in which the level is subject to changes and updating a prior collected average level of the substance comprising the steps of:
   (a) continuously determining values of differential pressure from within the tank;
   (b) determining the instantaneous level of substance within the tank in response to the determined values of differential pressure;
   (c) determining a difference relationship between the prior collected average level and the instantaneous level;
   (d) determining a relative weighting factor for the prior collected average level and the instantaneous level which weighting factor varies in accordance with the difference relationship;
   (e) determining a new collected average in response to the relative weighting factor; and
   (f) repeating steps b, c, d and e in which the new collected average becomes the prior collected average in step (c).

2. The method of claim 1 wherein step (e) is followed by the additional step of comparing the new collected average with a predetermined setpoint and providing a signal when the collected average is below the setpoint.

3. The method of claim 2 wherein the step of providing a signal includes the step of providing a signal to a remote display for providing a request for refilling the tank.

4. The method of claim 1 wherein step (b) includes the step of determining the instantaneous level of a cryogenic substance.

5. The method of claim 1 wherein step (d) includes the step of determining one of a plurality of tiers of relative weighting factors in accordance with the determined difference relationship.

6. The method of claim 5 wherein step (d) includes the steps of:
   (a) determining a first relative weighting factor if the levels are substantially equal and
   (b) determining a second relative weighting factor when the levels are unequal.

7. The method of claim 1 wherein step (d) includes the steps of:
   (a) determining whether the instantaneous level is substantially equal to the prior collected average for a predetermined period of time and assigning a first relative weighting factor if the determination is affirmative;
   (b) determining whether the collected average level and the instantaneous level are substantially unequal for less than a predetermined period of time and assigning a second relative weighting factor when the determination is affirmative; and
   (c) determining whether the prior collected average level and the instantaneous level are substantially unequal for longer than a predetermined period of time and assigning a third relative weighting factor when the determination is affirmative.

8. The method of claim 1 wherein step (e) is followed by the additional steps of:
   (a) reading values of pressure from within the tank; and
   (b) determining the volume of substance in the tank in response to the collected average and the pressure.

9. A system for measuring the level of substance in a tank in which the level is subject to change and updating a prior collected average level of the substance comprising:
   means for continuously determining the differential pressure of the tank for producing a differential pressure signal;
   means for determining the instantaneous level of substance within the tank in response to the differential pressure signal;

means for determining a difference relationship between the prior collected average level and the instantaneous level;

means for determining a relative weighting factor for the prior collected average level and the instantaneous level which weighting factor varies in accordance with the difference relationship;

time-weighted averager means for determining a new collected average level in response to the relative weighting factor and for applying the new collected average level to said difference determining means as the prior collected average level;

comparing means for determining when the new collected average is below a predetermined setpoint for producing a display signal; and remote display means for displaying the new collected average in response to the display signal.

10. The system of claim 9 in which there is provided means for determining the period of time for which the difference relationship has persisted and said time-weighted averager means includes means for determining the new collected average level in response to the period of time for which the difference relationship has persisted.

11. The system of claim 9 including means for determining a first relative weighting factor when the levels are substantially equal and a second relative weighting factor when the levels are unequal.

12. The system of claim 9 wherein the means for determining the instantaneous level of substance include means for determining the instantaneous level of cryogenic substance.

13. The system of claim 9 wherein there is further provided means for reading values of pressure from within the tank and determining the volume of substance average and pressure in response to the collected.

14. A remote tank telemetry system having telecommunication means and a tank containing substance comprising:

means for continuously determining the differential pressure of the tank for producing a differential pressure signal;

means for determining the instantaneous level of substance within the tank in response to the differential pressure signal;

means for determining a difference relationship between the instantaneous level and a prior collected average level;

means for determining a weighting factor for the prior collected average level and the instantaneous level which weighting factor varies in accordance with the difference relationship;

time-weighted averager means for determining a new collected average level in response to the relative weighting factor and for applying the new collected average level to said difference determining means as the prior collected average level;

comparing means for determining when the new collected average is below a predetermined setpoint for producing a display signal;

local display means for displaying the new collected average level;

storage means for storing the collected average levels;

means for coupling the time-weighted averager means to the telecommunication means; and remote display means coupled to the telecommunication means for displaying the collected average in response to the display signal.

* * * * *